(12) United States Patent
Ngadi et al.

(10) Patent No.: US 11,688,064 B2
(45) Date of Patent: *Jun. 27, 2023

(54) SYSTEMS, DEVICES, AND METHODS FOR DETECTING FERTILITY AND GENDER OF UNHATCHED EGGS

(71) Applicant: MATRIXSPEC SOLUTIONS INC., Baie d'Urfe (CA)

(72) Inventors: Michael Ngadi, Pierrefonds (CA); Li Liu, Sainte-Anne-de-Bellevue (CA); Chen Zheng, Vaughan (CA)

(73) Assignee: MATRIXSPEC SOLUTIONS INC., Baie d'Urfe (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/716,594

(22) Filed: Apr. 8, 2022

(65) Prior Publication Data
US 2022/0230313 A1 Jul. 21, 2022

Related U.S. Application Data

(63) Continuation of application No. 16/893,802, filed on Jun. 5, 2020, now Pat. No. 11,302,000, which is a
(Continued)

(51) Int. Cl.
*G06T 7/00* (2017.01)
*G06V 10/56* (2022.01)
(Continued)

(52) U.S. Cl.
CPC ............ *G06T 7/0012* (2013.01); *A01K 43/00* (2013.01); *G06F 18/211* (2023.01); *G06F 18/24* (2023.01);
(Continued)

(58) Field of Classification Search
CPC .......... G06T 7/0012; G06T 7/40; G06T 7/90; G06T 7/11; G06T 2207/10024;
(Continued)

(56) References Cited

U.S. PATENT DOCUMENTS 4,182,571 A 1/1980 Furuta et al.
4,671,652 A 6/1987 van Asselt et al.
(Continued)

FOREIGN PATENT DOCUMENTS

WO 2010150265 A2 12/2010

OTHER PUBLICATIONS

Patent Cooperation Treaty, Written Opinion and International Search Report dated May 3, 2016, issued on PCT Application No. PCT/CA2016/000039.
(Continued)

*Primary Examiner* — Aaron W Carter
(74) *Attorney, Agent, or Firm* — Bennett Jones LLP

(57) ABSTRACT

Disclosed are systems, devices, and methods for detecting characteristics of an unhatched egg. A set of images of an unhatched egg are obtained, where each of the spectral images is obtained in a particular wavelength range. The set of images is processed to extract image features, where the image features includes an image texture feature. The extracted image features are processed to classify the unhatched egg according to at least one characteristic. The at least one characteristic may include fertility and/or gender.

20 Claims, 27 Drawing Sheets

Related U.S. Application Data continuation of application No. 15/550,265, filed as application No. PCT/CA2016/000039 on Feb. 17, 2016, now Pat. No. 10,713,782.

(60) Provisional application No. 62/116,954, filed on Feb. 17, 2015.

(51) Int. Cl.
| | | |
|---|---|---|
| *G06F 18/24* | (2023.01) | |
| *G06F 18/211* | (2023.01) | |
| *G06F 18/25* | (2023.01) | |
| *G06V 10/764* | (2022.01) | |
| *G06T 7/90* | (2017.01) | |
| *A01K 43/00* | (2006.01) | |
| *G06T 7/40* | (2017.01) | |
| *G06T 7/11* | (2017.01) | |

(52) U.S. Cl.
CPC .............. *G06F 18/253* (2023.01); *G06T 7/40* (2013.01); *G06T 7/90* (2017.01); *G06V 10/56* (2022.01); *G06V 10/764* (2022.01); *G06T 7/11* (2017.01); *G06T 2207/10024* (2013.01); *G06T 2207/20024* (2013.01); *G06T 2207/30004* (2013.01); *G06T 2207/30044* (2013.01)

(58) Field of Classification Search
CPC . G06T 2207/20024; G06T 2207/30004; G06T 2207/30044; A01K 43/00; G06F 18/211; G06F 18/24; G06F 18/253; G06V 10/56
See application file for complete search history.

(56) References Cited

U.S. PATENT DOCUMENTS

| | | | |
|---|---|---|---|
| 4,914,672 | A | 4/1990 | Hebrank |
| 4,955,728 | A | 9/1990 | Hebrank |
| 6,234,320 | B1 | 5/2001 | Hebrank |
| 6,396,938 | B1 | 5/2002 | Tao |
| 6,587,575 | B1 | 7/2003 | Windham et al. |
| 7,167,179 | B2 | 1/2007 | Nozawa |
| 7,167,579 | B2 | 1/2007 | Taniguchi |
| 7,845,640 | B2 | 12/2010 | Moteg et al. |
| 7,893,034 | B2 | 2/2011 | Slack et al. |
| 8,393,953 | B2 | 3/2013 | Nishimura et al. |
| 9,163,274 | B2 | 10/2015 | Akai et al. |
| 9,179,651 | B2 | 11/2015 | McKay |
| 9,224,200 | B2 | 12/2015 | Bruun et al. |
| 9,351,998 | B2 | 5/2016 | Harris, Jr. et al. |
| 9,702,859 | B2 | 7/2017 | Walukas |
| 9,835,560 | B2 | 12/2017 | Galli |
| 10,222,260 | B2 | 3/2019 | McQuilkin |
| 10,607,338 | B2 * | 3/2020 | Ngadi ................... G06F 18/253 |
| 10,713,782 | B2 | 7/2020 | Ngadi |
| 11,302,000 | B2 * | 4/2022 | Ngadi .................... G06T 7/0012 |
| 2002/0075476 | A1 | 6/2002 | Chalker, II et al. |
| 2002/0157613 | A1 | 10/2002 | Phelps |
| 2003/0003437 | A1 | 1/2003 | Rozenboim |
| 2003/0185422 | A1 | 10/2003 | Taniguchi |
| 2004/0040515 | A1 | 3/2004 | Taniguchi |
| 2008/0283449 | A1 | 11/2008 | Madsen |
| 2013/0044210 | A1 | 2/2013 | Rozenboim |
| 2016/0069743 | A1 | 3/2016 | McQuilkin |
| 2016/0100557 | A1 | 4/2016 | Adar |
| 2016/0239953 | A1 | 8/2016 | Ngadi |
| 2017/0074464 | A1 | 3/2017 | Grajcar |
| 2017/0103504 | A1 | 4/2017 | Jimenez Cisneros |
| 2017/0105391 | A1 | 4/2017 | Grajcar |
| 2017/0205353 | A1 | 7/2017 | Galli |
| 2018/0033139 | A1 | 2/2018 | Ngadi |
| 2019/0159433 | A1 | 5/2019 | Feinberg |
| 2019/0174726 | A1 | 6/2019 | Knepper |
| 2019/0195689 | A1 | 6/2019 | McQuilkin |
| 2019/0383782 | A1 | 12/2019 | Steiner |
| 2020/0088580 | A1 | 3/2020 | Darty |
| 2020/0110068 | A1 | 4/2020 | Green |
| 2020/0281166 | A1 | 9/2020 | Haase |
| 2020/0302604 | A1 | 9/2020 | Ngadi |
| 2020/0400640 | A1 | 12/2020 | Preusse |
| 2022/0230313 | A1 * | 7/2022 | Ngadi ....................... G06T 7/40 |

OTHER PUBLICATIONS

Liu et al., Detecting Fertility and Early Embryo Development of Chicken Eggs Using Near-Infrared Hyperspectral Imaging, Food Bioprocess Technology, Sep. 2013, vol. 6, Issue 9, pp. 2503-2513. First online: Aug. 2, 2012. [Retrieved on Apr. 28, 2016] Retrieved from the Internet: <<URL: https://www.researchgate.net/publication/257764094_Detecting_Fertility_and_Early_Embryo_Development_of_Chicken_Eggs_Using_Near-Infrared_Hyperspectral_Imaging>>.

USPTO, Office Action for U.S. Appl. No. 15/045,891 dated Jul. 3, 2017.

Kiratiratanapruk et al., "Silkworm Egg Image Analysis Using Different Color Information for Improving Quality Inspection", ISPACS, pp. 1-6, 2016.

Gormus et al., "A Novel Decision Fusion Approach to Improving Classification Accuracy of Hyperspectral Images", IEEE (Year: 2012).

Author Unknown, "Hyperspectral Imaging", Wikipedia page version from Feb. 12, 2015 (Year: 2015).

Rajadell et al., "Spectral-Spatial Pixel Characterization Using Gabor Filters for Hyperspectral Image Classification", IEEE, Jul. 2013 (Year: 2013).

Lawrence K C et al., "Egg embryo development detection with hyperspectral imaging", Visual Communications and Image Processing; vol. 6381, Oct. 3, 2006, pp. 63810T-1, XP002608150.

EPO, Extended European Search Report for EP 16751842.2 dated Aug. 8, 2018.

Huang, H. et al., Recent developments in hyperspectral imaging for assessment of food quality and safety, Sensors, vol. 14, No. 4, pp. 7248-7276 (2014).

Huang, H. et al., "Rapid and non-inasive quantification of intramuscular fat content of intact pork cuts", Talanta, vol. 119, pp. 385-395 (2013).

EPO, Office Action for EP 16751842.2 dated Jun. 26, 2020.

USPTO, Office Action for U.S. Appl. No. 16/893,802 dated Aug. 11, 2021.

* cited by examiner

Brown-Day 0

White - Day 0

SYSTEMS, DEVICES, AND METHODS FOR DETECTING FERTILITY AND GENDER OF UNHATCHED EGGS

CROSS REFERENCE TO RELATED APPLICATIONS

This application is a continuation of U.S. patent application Ser. No. 16/893,802 filed on Jun. 5, 2020, which is a continuation of U.S. patent application Ser. No. 15/550,265 filed on Aug. 10, 2017, which is a national stage entry of PCT/CA2016/000039 filed Feb. 17, 2016, and claims the benefit of U.S. Provisional Patent Application No. 62/116,954 filed Feb. 17, 2015, all of which are herein incorporated by reference in their entirety.

FIELD

This relates to detection of fertility and/or gender of unhatched eggs, and more particularly, to automated detection of fertility and/or gender of unhatched eggs using image data.

BACKGROUND

Only about 60 to 90% of incubated eggs hatch in commercial hatcheries. Non hatching eggs include infertile eggs or fertile eggs in which the embryos had died during incubation. Infertile eggs, usually comprising up to 25% of all eggs, can find useful applications as commercial table eggs or low grade food stock if they are detected early and isolated accordingly prior to incubation. Discarding of non-hatching eggs has consistently posed significant disposal problems for hatcheries, especially in the case of exploder eggs in a hatching cabinet, resulting in high tendency of transferring molds and bacteria infestation to other eggs. Thus, identification and isolation of infertile eggs have significant economic and safety implications for commercial broiler breeders.

Candling is a technique which illuminates the interior of the egg for the purpose of detecting dead or infertile eggs. However, candling is laborious and prone to errors. Studies have shown that only 5% of total eggs can be candled after ten days of incubation. The difficulty of separating the non-fertile eggs from the remaining non-candled 95% of eggs makes this technique unadoptable to industrial and large scale operations.

The sex of fertile eggs is also among the egg characteristics of interest for the poultry industry. In the layer egg industry, chicks are sexed at hatch and the female birds (that will lay eggs) are considered paramount while the male birds are culled. The opposite is the case with the broiler industry in which the male species are crucial. In either case, discarding of the unwanted chicks creates serious bottlenecks as far as waste disposal and animal welfare issues are concerned.

Several approaches have been used to determine the gender of fertile eggs based on molecular and hormone assays that are laborious and invasive in nature. The techniques are of limited use in the industry as they are unsuitable for automated, high throughput applications.

Other approaches have used computer vision and spectroscopy to determine gender and/or fertility of unhatched eggs. However, such approaches have suffered from various drawbacks, including for example, poor performance on brown eggs, being limited in the data considered (e.g., limited to spatial data or limited to spectral data), being tested only on artificially fertilized eggs, etc.

Therefore, there is a need for improved technology for detecting gender and/or fertility of unhatched eggs.

SUMMARY

In accordance with an aspect, there is provided a device for detecting a characteristic of an unhatched egg. The device includes an imaging interface configured to receive a set of images of an unhatched egg, each of the images obtained in a particular wavelength range; a feature extractor configured to process the set of images to extract image features, the image features including an image texture feature; and a classifier configured to process the extracted image features to classify the unhatched egg according to at least one characteristic. The device is operable to transmit a control signal to actuate an apparatus according to the classified unhatched egg. The device is operable to generate data signals for the gender and fertility of the unhatched egg, for example. The device is operable to transmit the output data signals to hardware or apparatus to trigger actuation thereof. For example, the triggered apparatus may move or separate the unhatched egg. Other characteristics include texture of yolk and hue, for example.

In accordance with another aspect, there is provided a computer-implemented method of detecting a characteristic of an unhatched egg. The method includes receiving, by way of an image interface, a set of images of an unhatched egg, each of the images obtained in a particular wavelength range; processing, at at least one processor, the set of images to extract image features, the image features including an image texture feature; and processing, at the at least one processor, the extracted image features to classify the unhatched egg according to at least one characteristic.

In accordance with a further aspect, there is provided a system for detecting a characteristic of an unhatched egg. The system includes an imaging device for capturing a set of images of an unhatched egg, each of the images obtained in a particular wavelength range; and at least one processor in communication with the imaging device. The at least one processor is configured to: process the set of images to extract image features, the image features including an image texture feature; and process the extracted image features to classify the unhatched egg according to at least one characteristic.

The at least one characteristic may include gender of the unhatched egg.

The at least one characteristic may include fertility of the unhatched egg.

The unhatched egg may be a white egg.

The unhatched egg may be a brown egg.

Many further features and combinations thereof concerning embodiments described herein will appear to those skilled in the art following a reading of the instant disclosure.

DESCRIPTION OF THE FIGURES

In the figures,

FIGS. 10A, 10B, 100, 10D, 10E, and 10F are mean profiles of spectral image features for fertility of brown and white eggs;

DETAILED DESCRIPTION

Figure 1:
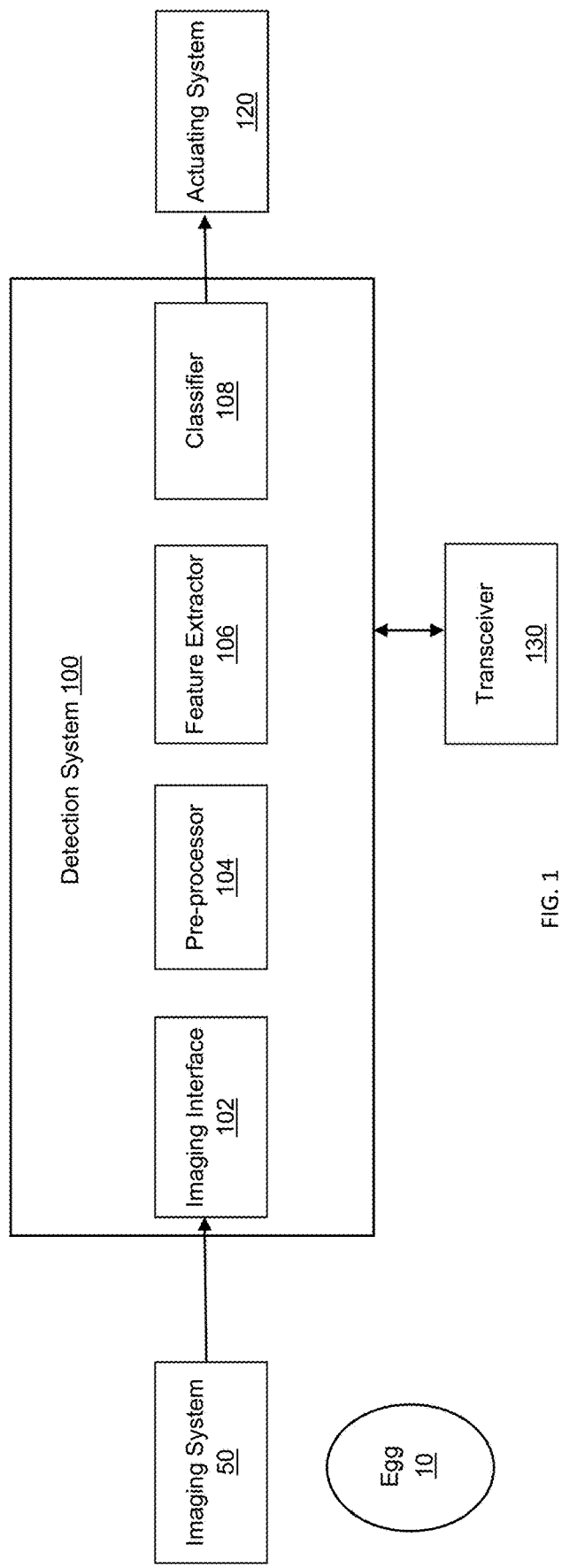
FIG. 1 is a high-level block diagram of a detection system, interconnected with an imaging system, exemplary of an embodiment.

FIG. 1 illustrates an imaging system 50 interconnected with a detection system 100. Imaging system 50 provides detection system 100 with spectral image data of unhatched eggs (e.g., eggs 10) and detection system 100 processes that data to detect fertility and/or gender of the unhatched eggs. Detection of fertility and/or gender in manners disclosed herein takes into account both spatial and spectral information conveyed in the images of unhatched eggs. Detection of fertility and/or gender in manners disclosed herein uses multiple image features extracted from the images. The multiple image features may be fused in manners disclosed herein.

In an embodiment, imaging system 50 and detection system 100 are each configured for use with egg 10 that are chicken eggs. In other embodiments, eggs 10 may include other types of eggs, e.g., other avian eggs.

Imaging system 50 may be a hyperspectral imaging system that captures a set of images for each egg 10, with each image containing spatial data obtained of a particular wavelength range. Each such image may be referred to herein as a "spectral image". In an embodiment, the set of spectral images forms a three-dimensional data cube, with spatial information provided along two axes and spectral information (for each pixel position) along a third axis.

In an embodiment, imaging system 50 captures a set of 167 images for each egg 10, corresponding to images captured using light in 167 wavelength bands in a range from approximately 900 nm to 1700 nm. In this embodiment, the size of each wavelength band may be approximately 4 nm. In other embodiments, imaging system 50 may capture a greater or fewer number of images for each egg 10, corresponding to a greater or fewer number of wavelength bands. Further, the size of each wavelength band may vary.

In an embodiment, imaging system 50 includes a line-scan spectrograph interconnected with an InGaAs camera configured to capture the spectral images. In one example implementation, the spectrograph is a Hyperspec™ spectrograph provided by Headwall Photonics Inc. (USA) with a near-infrared spectral range spanning approximately 900 nm to 1700 nm and a spectral resolution of 2.8 nm. In an embodiment, image data is collected in transmission mode. In an embodiment, image data is collected and processed at 100 frames per second. In an embodiment, imaging system 50 may include a wide field, area scan, snapshot camera.

In an embodiment, imaging system 50 includes one or more light sources to provide back illumination for egg 10 to facilitate image capture. In one example implementation, a single 50-watt tungsten halogen lamp is used as a light source.

In an embodiment, imaging system 50 may include a conveyor configured to move egg 10 into the field of view of the system's camera optics. In one example implementation, the conveyor is a Dorner 2200 series conveyer provided by Dorner Mfg. Corp. (USA), driven by a MDIP22314 stepping motor provided by Intelligent Motion System Inc. (USA). The speed of the conveyor may be adjustable. For example, the speed of the conveyor may be adjusted based on the speed of the camera optics to minimize image distortion (e.g., motion blur). The speed of the conveyor may also be adjusted based on other factors, e.g., desired detection throughput.

The conveyor may include trays adapted to receive eggs 10 therein, and maintain each egg 10 in a given position (e.g., a vertical position).

In an embodiment, the conveyor may be configured to present multiple eggs 10 (e.g., two eggs, four eggs, etc.) to be imaged simultaneously by imaging system 50. Accordingly, in this embodiment, each spectral image may include data for multiple eggs 10, and each such image may be segmented during processing to isolate data for each egg 10. Detection system 100 and/or imaging system 50 may be configured to send control commands to conveyor to control its movement.

Imaging system 50 may be interconnected with detection system 100 by way of a conventional serial or parallel interface. In an embodiment, imaging system 50 may be interconnected with detection system 100 by way of a network comprising wired links, wireless links, or a combination thereof. In this embodiment, one or both of imaging system 50 and detection system 100 may include a suitable network interface and/or network transceivers.

The detection system 100 connects to an actuating system 120 to trigger actuation of apparatuses based on results computed by detection system 100. The detection system 100 is operable to transmit a control signal to actuate an apparatus according to the classified unhatched egg. The detection system 100 is operable to generate data signals for the gender and fertility of the unhatched egg, for example. The detection system 100 is operable to transmit the output data signals to hardware or apparatus (e.g. actuating system 130) to trigger actuation thereof. For example, the actuating system 130 may move or separate the unhatched egg. Other characteristics include texture of yolk and hue, for example.

The actuating system 100 may receive data signals of classification results from the detection system 100 and removes the undesired eggs (non-fertile and/or male) from the assembly line using one or more apparatuses that are in physical contact with the eggs or otherwise can trigger movement or separation of eggs. For example, actuating system 100 may include or interface with one or more robotic arms with end effectors (robotic hands) that may be used to grasp and drop or replace eggs which are indicated by the classification signals from detection system 100 as non-fertile and/or male eggs. There may be other apparatuses that can separate or move eggs based on the classification signals from detection system 100 and this is an illustrative example only. Accordingly, the actuating system 120 triggers actuation of hardware components based on the classification signals from detection system 100. In example embodiments the actuation may involve physical movement of the eggs to separate the eggs into different streams, for example. As another example a conveyer may be triggered or controlled to move eggs. Detection system 100 generates output signals for actuating system 120 to provide control commands to trigger actuation of various apparatuses.

Detection system 100 connects to a transceiver 130 to receive and/or send data to other components and systems. For example, detection system 100 may receive data sets from other systems to update its internal data (used by pre-processor 104, a feature extractor 106, and a classifier 108, for example) via machine learning techniques for example. Detection system 100 may also connect to imaging system 50 and/or actuating system 120 via the transceiver 130, for example. As another example, detection system 100 may send control commands or signals to transceiver 130 to control other components based on the classification results, for example, or to trigger capturing of image data from imaging system 50, as another example. Detection system 100 may connect to a central data repository (not shown) to provide classification results for central management and storage at the data repository, where the results may be correlated with results from other detection systems, for example. This may facilitate generation of comprehensive reports on classification data, for example.

As shown in FIG. 1, detection system 100 includes an imaging interface 102, a pre-processor 104, a feature extractor 106, and a classifier 108. As will be detailed below, these components of detection system 100 cooperate to detect fertility and/or gender of unhatched eggs.

Imaging interface 102 is configured to receive image data from imaging system 50, and to format the data for processing at detection system 100.

Pre-processor 104 is configured to pre-process spectral images received at detection system 100 from imaging system 50. The images may be calibrated and normalized based on the percent transmission. For example, in an embodiment, upon calibration and normalization, the pixel values of each spatial image (e.g., each plane of an output hypercube) may be between 0 (corresponding to the dark image, i.e., no light transmitted) and 1 (corresponding to the white image, i.e. all light from the light source transmitted).

In an embodiment, pre-processor 104 identifies a region of interest (ROI) in the images corresponding to each individual egg 10 in the images. For example, a mask may be used to segment the ROI. Image segmentation may be used, for example, when an image includes multiple eggs. For example, an adaptive thresholding technique may be used to create a mask for segmentation of ROI. A boundary detection-based image segmentation may be used, for example, when an image includes multiple eggs.

In an embodiment, pre-processor 104 applies other types of pre-processing, e.g., filtering to de-noise, to sharpen, etc.

Feature extractor 106 is configured to process image data to extract one or more image features of interest. The image data may, for example, be image data pre-processed by pre-processor 104. The image data may be segmented to include data for an individual egg.

The extracted image features of interest may include image texture features. The extracted image features may include image features described in first order measures. The extracted image features may also include image features described in second order measures.

As used herein, an image feature means a quantifiable property of the image which may be measured as characteristics of an imaged object (e.g., an egg). As used herein, an image texture feature is a feature that describes the smoothness, coarseness, and regularity of the image. An image texture feature may also include colour, intensity, homogeneity, hue, texture of yolk, and surface structure information of an image. So, an image texture feature may contain information about the spatial distribution of tonal variations within a wavelength band.

First order measures are statistical, are calculated from individual pixels and do not consider pixel neighborhood relationships. First order measures include, for example, an intensity histogram and intensity features.

In contrast, relationships between neighboring pixels are considered for second order measures. Second order textural measures may, for example, be extracted using the Gray Level Co-Occurrence Matrix (GLCM) technique. In general, GLCM provides a 2-D histogram of grey levels for a pair of pixels, which are separated by a fixed spatial relationship. Several possible second order textural features may be extracted. Such features are typically based on selected statistics which summarize the relative frequency distribution describing how often one grey tone will appear in a specified spatial relationship to another grey tone on the image.

For example, a feature may be defined by the following:

$$C_{\Delta x, \Delta y}(i, j) = \sum_{p=1}^{n} \sum_{q=1}^{m} C_{p,q} \begin{cases} 1, \text{ if } I(p, q) = i \text{ and } I(p + \Delta x, q + \Delta y) = j \\ 0, \text{ otherwise} \end{cases} \quad (1)$$

where C is the co-occurrence matrix applied for the calculation of GLCM features' input variation, i and j are the image intensity values of the image, p and q are the spatial positions in the image and the offset ($\Delta x$, $\Delta y$).

In the depicted embodiment, feature extractor 106 is configured to extract three first order features, namely, Arithmetic Mean Spectral image features (AMS), Trim Mean Spectral image features (TMS) and Image Entropy Spectral features (IES). In this embodiment, feature extractor 106 is also configured to extract three GLCM-based features as second order features, namely, Energy Spectral image features (ES), Homogeneity Spectral image features (HS) and Contrast Spectral image features (CS). Each of these features are further described below.

First Order Features

Mean spectral features describe the average tonal variations in the various electromagnetic spectrum bands. Feature extractor 106 extracts two different mean spectral features: AMS and TMS. AMS evaluates the average spectral intensity including normal (such as component of egg) and abnormal variations (such as sensor noise and light source noise). TMS reduces the effects of statistical outliers by removing a small percentage of the largest and smallest values among a set of numbers (such as pulse noise), before calculating the average of those numbers.

Feature extractor 106 determines AMS and TMS as follows:

$$AMS = \frac{\sum_{i=1}^{N}\sum_{j=1}^{M} S\,Img(i,j)}{M \times N} \quad (2)$$

$$TMS = \frac{\sum_{i=1}^{N}\sum_{j=1}^{M} S\,Img(i,j) - M\,\text{in}(K1,p) - \text{Max}(K2,p)}{M \times N - K1 - K2} \quad (3)$$

where SImg(i,j) is the two dimension spectral image, (ij) refers to a pixel in the image; M and N describe the number of pixels in the vertical and horizontal directions, respectively; p is the defined percentage of pixels having extreme intensities. K1 and K2 describe the number of pixels having the lowest and highest p/2 percent image pixel values, respectively.

Image entropy is a measure of the grey level distribution (disorder or randomness) in an image histogram. The image information entropy is greater if the grey intensity values distributed in the image trend to the average value, indicating that texture may exist in the images.

Feature extractor 106 extracts one image entropy feature, namely, IES. Feature extractor 106 determines IES as follows:

$$IES = -\text{sum}(P \times \log 2(P)) \quad (4)$$

where P contains the histogram counts for all grey value levels.

Second Order Features

Feature extractor 106 extracts three GLCM-based features, relating to energy, homogeneity and contrast (ES, HS and CS, respectively). The ES feature, also called Uniformity or Angular Second Moment, measures textural uniformity, which is pixel pair repetitions. It detects disorders in textures. When the variation in image gray scale is flat and slow, the gray level co-occurrence matrix tends to concentrate in a specific value. A greater energy feature value means that texture in the images is less likely to exist.

Feature extractor 106 determines ES as follows:

$$ES = \Sigma_i \Sigma_j C_{i,j}^2 \quad (5)$$

The HS feature, also known as Inverse Difference Moment, measures image homogeneity as it assumes larger values for smaller gray tone differences in pair elements. Homogeneity is a measure that takes high values for low contrast images.

Feature extractor 106 determines HS as follows:

$$HS = \sum_i \sum_j \frac{C_{i,j}}{1+|i-j|} \quad (6)$$

The CS feature measures the spatial frequency of an image. It is the difference between the highest and the lowest values of a contiguous set of pixels. Thus, it measures the amount of local variations present in an image. A low-contrast image presents GLCM concentration term around the principal diagonal and features low spatial frequencies.

Feature extractor 106 determines CS as follows:

$$CS = \Sigma_i \Sigma_j (i-j)^2 C_{i,j} \quad (7)$$

Image features extracted by feature extractor 106 are provided to classifier 108.

Classifier 108 is configured to classify each egg according to at least one characteristic, namely, gender and/or fertility.

In an embodiment, classifier 108 performs classification by applying a Partial Least Squares Regression (PLSR) Model along with an optical threshold. A PLSR model, in conjunction with an optical threshold, may be used to separate two levels of data. In the depicted embodiment, classifier 108 implements PLSR to classify egg fertility and/or gender, each consisting of two levels.

A PLSR model may be particularly effective for constructing predictive models when the factors are many and highly collinear, as may be the case when the input data includes multiple spectral image features.

In an embodiment, the particular PLSR model implemented in classifier 108 may be described using MATLAB notation as follows:

$$[XL,YL,XS,YS,\text{BETA},\text{PCTVAR}] = \text{plsregress}(X,Y,n\text{comp}) \quad (8)$$

where X is an N×P matrix of predictor data set with rows corresponding to observations and columns to variables, Y is an N×1 response matrix, ncomp is the number of components of PLSR as predictors. XL is a P×ncomp matrix of predictor loadings, where each row include coefficients that define a linear combination of PLS components that approximate the original predictor variables. YL is an M×ncomp matrix of response loadings, where each row contains coefficients that define a linear combination of PLS components that approximate the original response variables. BETA is regression coefficients with a (P+1)×N matrix. PCTVAR is a 2×ncomp matrix with the percentage of variance explained by the model.

Figure 2:
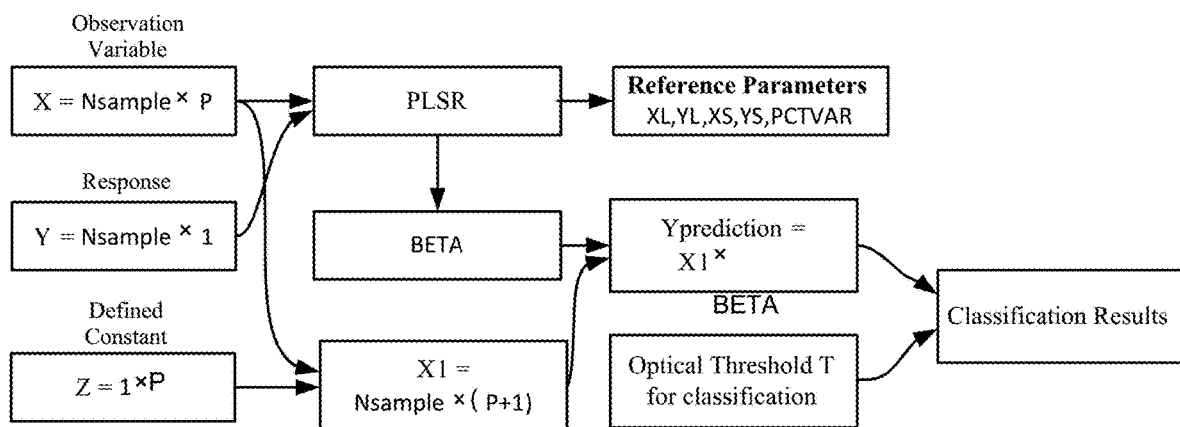
FIG. 2 is flow diagram of PLSR classification with an optical threshold, as may be implemented by the detection system of FIG. 1, exemplary of an embodiment.

FIG. 2 illustrates an exemplary layout of a PLSR model 200 with optical threshold technique, in accordance with an embodiment. The observation sets X and Y responses are set as input into the PLSR model 200 in order to obtain the regression coefficients BETA. Observation set X and defined constant set Z are combined to obtain a new matrix X1 which works with BETA in order to obtain Y prediction. Then, the classification result may be calculated based on Yprediction and optical threshold T. The optical threshold T may be pre-configured in classifier 108, and may be determined experimentally, e.g., using training data.

Figure 3:
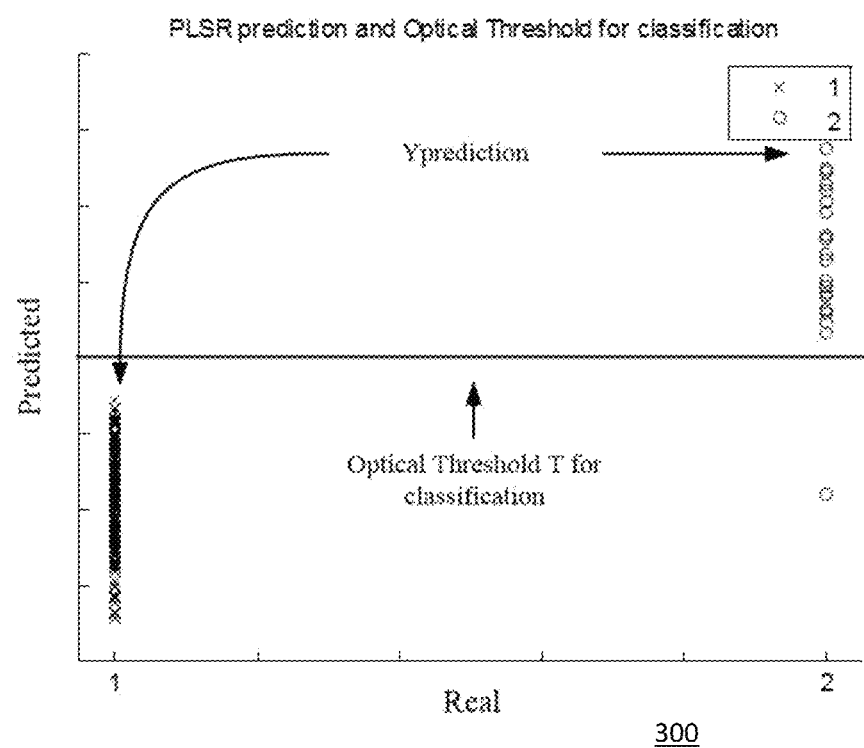
FIG. 3 is a graph of the PLSR classification with an optical threshold of FIG. 2, exemplary of an embodiment.

FIG. 3 illustrates a graph 300 with the application of an optical threshold T, exemplary of an embodiment.

Multiple optical thresholds may be used. For example, an optical threshold T may be defined for each egg characteristic for which classification is performed (e.g., fertility, gender, etc.). An optical threshold T may be defined for each particular group of image features used for classification. An optical threshold T may be defined for each particular wavelength range used for classification.

In other embodiments, classifier 108 may use a different supervised and/or unsupervised classification method. For example, Principal Component Analysis, Linear Discriminant Analysis, Logistic regression, Neural Networks, Support Vector Machines, Decision Tree, or clustering methods such as K-means algorithm, Mahalanobis distance classification, and so on, may be used.

Imaging interface 102, pre-processor 104, feature extractor 106, and classifier 108 may each be configured using a conventional computing language such as C, C++, C#, Java, MATLAB, or the like. Imaging interface 102, pre-processor 104, feature extractor 106, and classifier 108 may each be in the form of executable applications, scripts, or statically or dynamically linkable libraries.

Figure 4:
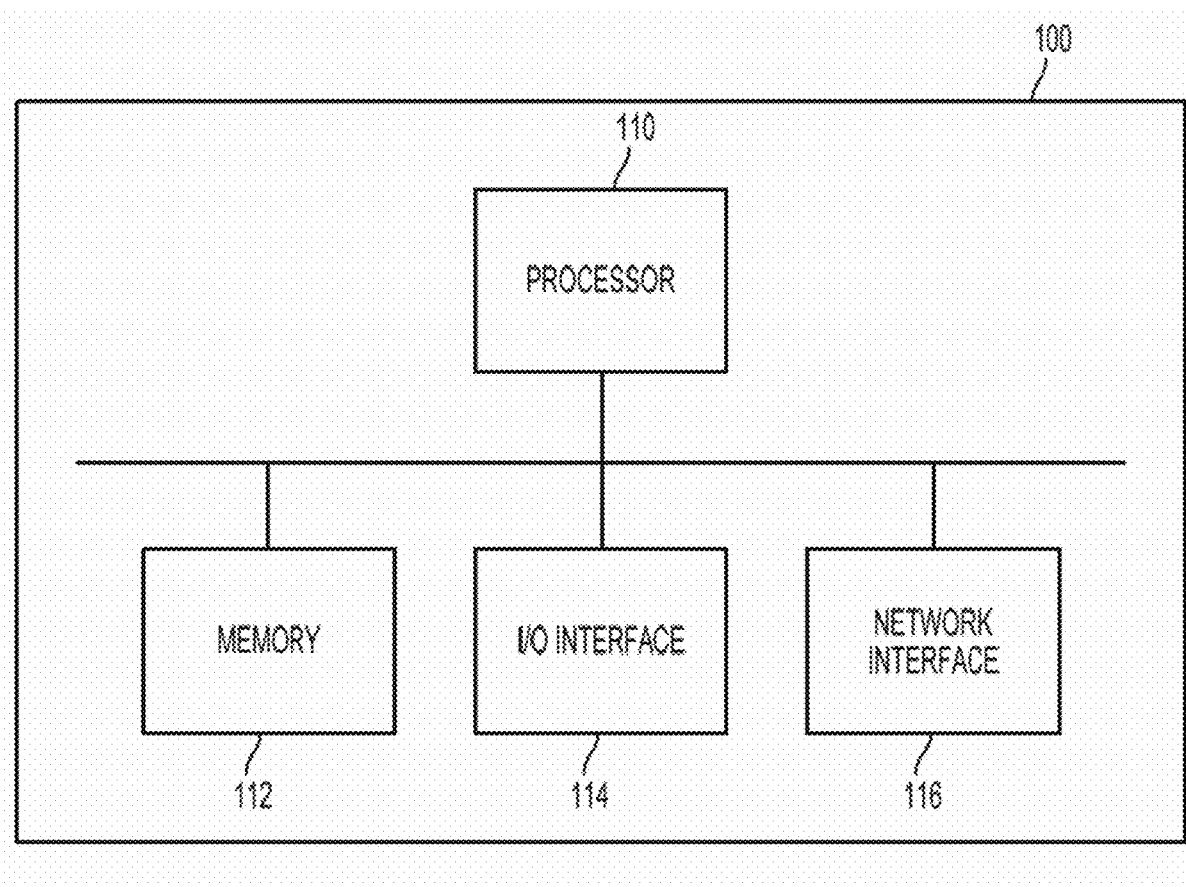
FIG. 4 is a high-level block diagram of hardware components of the detection system of FIG. 1, exemplary of an embodiment.

FIG. 4 illustrates hardware components of detection system 100, exemplary of an embodiment. As depicted, detection system 100 includes at least one processor 110, memory 112, at least one I/O interface 114, and at least one network interface 116.

Processor 110 may be any type of processor, such as, for example, any type of general-purpose microprocessor or microcontroller, a digital signal processing (DSP) processor, an integrated circuit, a field programmable gate array (FPGA), a reconfigurable processor, or any combination thereof.

Memory 112 may be any type of electronic memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

I/O interface 114 enables detection system 100 to interconnect with other devices and systems for input and/or output. For example, I/O interfaces 114 enables detection system 100 to interconnect with imaging system 50. I/O interfaces 114 also enables detection system 100 to interconnect with peripheral devices or external storage devices. Such peripheral devices may include one or more input devices, such as a keyboard, mouse, camera, touch screen and a microphone, and may also include one or more output devices such as a display screen and a speaker.

Network interface 116 enables detection system 100 to communicate by way of a network, e.g., to retrieve image data from a remote imaging system, or to provide detection results to a remote location. For example, in one embodiment, image detection 50 may be located at a hatchery, and detection system 100 may be located at another location, e.g., in the cloud and may be interconnected with imaging system 50 by way of a network (e.g., the Internet). Network interface 116 enables detection system 100 to communicate with other systems to transmit classification results and control remote actuation of apparatuses to e.g. move the eggs. As an example, network interface 116 enables detection system 100 to communicate with actuating system 120 (FIG. 1) to send classification results and trigger actuation of components based on the classification results. As another example, network interface 116 enables detection system 100 to communicate with transceiver 130 (FIG. 1) to send and receive data from other systems and components, such as images or results.

Detection system 100 may be embodied in a computing device, such as a personal computer, workstation, server, portable computer, mobile device, laptop, tablet, smart phone, or the like particularly configured as described herein.

Figure 5:
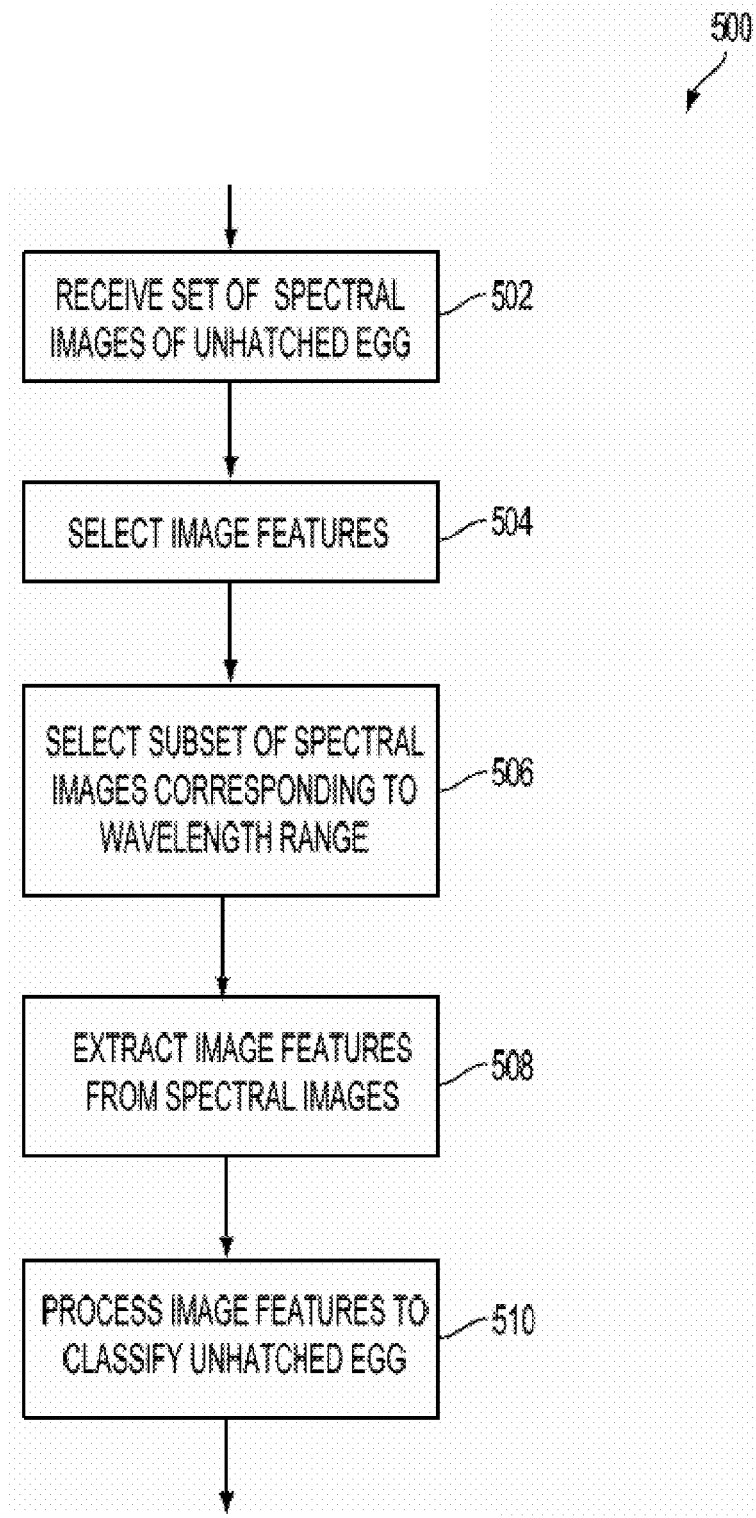
FIG. 5 is a flowchart showing detection of egg characteristics, exemplary of an embodiment.

The operation of detection system 100 may be further described with reference to FIG. 5, which illustrates exemplary blocks performed at detection system 100 to detect at least one characteristic of an egg, e.g., gender and/or fertility, exemplary of an embodiment.

As depicted, at block 502, detection system 100 receives a set of spectral images of a particular egg (e.g., egg 10). The spectral images may be received by way of imaging interface 102 from image system 50. Each of the spectral images may be an image obtained in a particular wavelength range. In an embodiment, each of the spectral images may be an image obtained for a particular wavelength.

At block 504, detection system 100 optionally selects a group of image features to be extracted from the spectral images. The group of image features may include two or more of the example image features described herein (e.g., AMS, TMS, IES, ES, HS, CS). The group of image features may also include other image features.

In an embodiment, the group of image features may be selected based on the particular egg characteristic to be detected. For example, the group may be selected as a group that provides improved detection performance (e.g., accuracy) for the particular egg characteristic compared to other groups. So, a group selected for detection of gender may differ from a group selected for detection for fertility. The group selected may also depend on egg colour (e.g., white or brown). The colour may be used for different industry applications. Further, the colour may be used for calibration.

Selection of the group of image features is further discussed below, and detection performance is evaluated for various groups of image features, for each of gender and fertility.

In an embodiment, the group of image features to be used may be pre-configured, and block 504 may be omitted.

At block 506, detection system 100 selects a subset of spectral images, from which image features are to be extracted. The subset of spectral images corresponds to at least one wavelength range, and each range may include one or more of the wavelength bands described above.

In an embodiment, the particular subset of spectral images may be selected based on the particular egg characteristic to be detected. For example, the selected subset may be selected as a subset that provides improved detection performance (e.g., accuracy) for the particular egg characteristic compared to other subsets. So, a subset selected for detection of gender may differ from a subset selected for detection for fertility.

In an embodiment, the subset of spectral images to be processed, or the corresponding wavelength range(s), may be pre-configured, and block 506 may be omitted.

At block 508, feature extractor 106 of detection system 100 processes the spectral images to extract image features of interest. In an embodiment, the spectral images may be pre-processed by pre-processor 104 prior to extraction of image features, e.g., to perform image segmentation of the region of interest for a particular egg.

In an embodiment, feature extractor 106 extracts only selected image features as the image features of interest. In an embodiment, feature extractor 106 processes only a selected subset of spectral images.

For each egg, an extracted image feature may be described as an N×1 vector, where N is the number spectral images. N is also the number of wavelength bands. So, when an image feature is extracted from 167 wavelength bands, the extracted image features may be described as a 167×1 vector.

In an embodiment, feature extractor 106 fuses extracted image features. Feature extractor 106 may also fuse extracted image features in various levels. In one example, feature extractor 106 may fuse extracted image features at a feature level, e.g., by extracting image features from each of the obtained images, respectively, and then combining the extracted image features into one feature vector. In another example, feature extractor 106 may fuse extracted image features at an image level, e.g., by combining multiple obtained images into one fused image and then extracting features from the fused image. In either case, the fused image features may then be provided to classifier 108 for classification.

In yet another example, feature extractor 106 may fuse extracted image features at a decision level, in cooperation with classifier 108. In particular, feature extractor 106 may extract image features from each of the obtained images, and classifier 108 may classify each image based on that image's image features. An aggregate classification decision may be made on the classification results for all of the images, e.g., by voting.

At block 510, classifier 108 of detection system 100 processes the extracted image features to classify the unhatched egg according to at least one characteristic, e.g., fertility and/or gender. So, an optical threshold T may be defined, e.g., for a particular characteristic to be detected, for the image features of interest, and the wavelength range of interest. Classification may then be performed using a PLSR model in conjunction with the optical threshold T.

Classifier 108 provides an indicator of the classified characteristic. For example, classifier 108 provides an indicator of whether the egg is detected to be male or female, and/or an indicator of whether the egg is detected to be fertile or infertile.

Blocks 504 and onward may be repeated for additional characteristics to be detected. Blocks 502 and onward may be repeated for additional eggs.

Conveniently, the depicted embodiment facilitates early detection of fertility and/or gender, e.g., prior to incubation.

Figure 6:
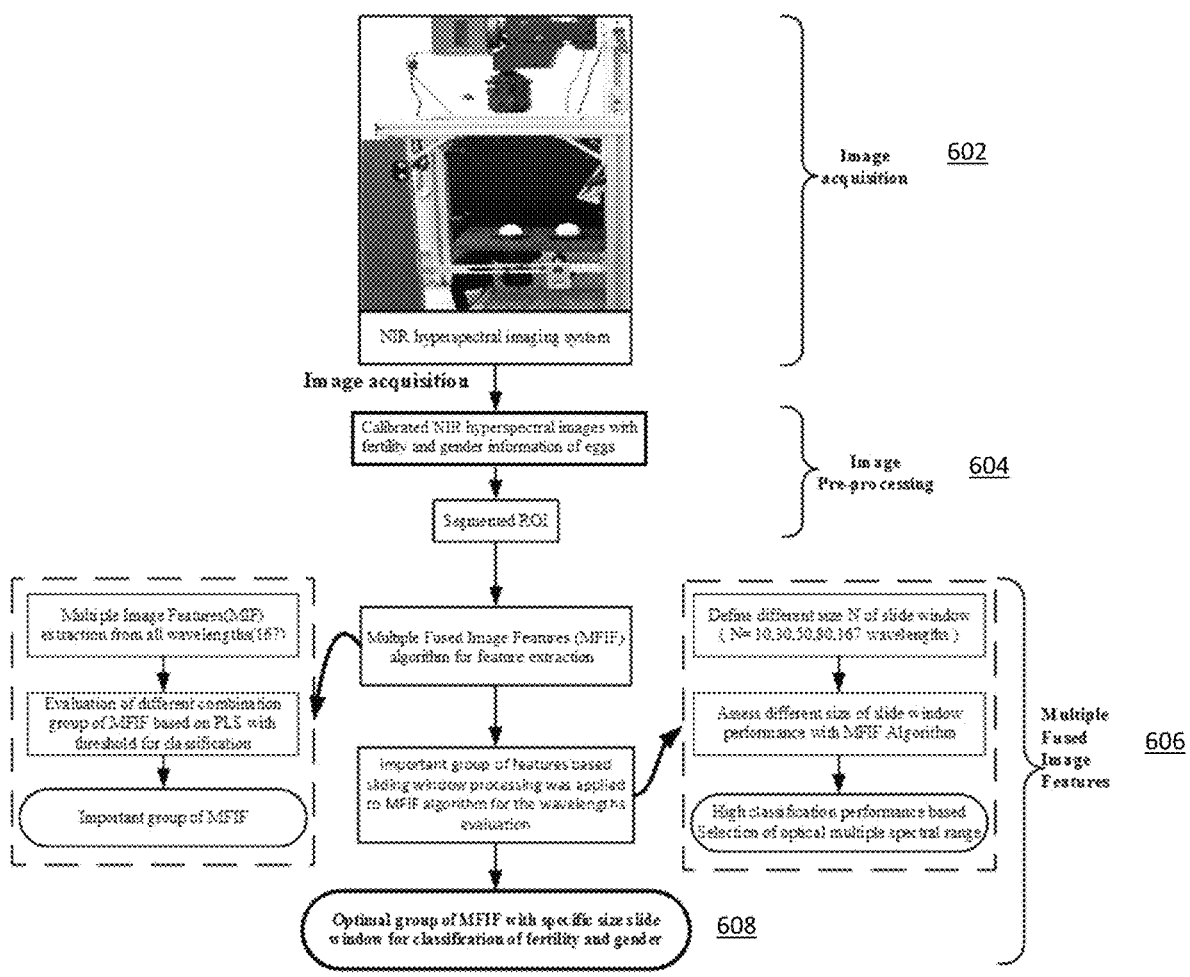
FIG. 6 is a flowchart showing detection of egg characteristics with selection of groups of image features, and selection of wavelength ranges, exemplary of an embodiment.

FIG. 6 illustrates a flowchart 600 of selection of groups of image features, and selection of wavelength ranges, exemplary of an embodiment. As illustrated, at image acquisition 602, spectral images are captured by an imaging system. At image pre-processing 604 the image system is calibrated by using the colour of the egg, for example. The pre-processing 604 segments the images data into ROI and filters out background image data from the egg related image data. Then, these spectral image features are processed to select a group of image features of interest for detecting a particular egg characteristic (e.g., gender, fertility, etc.) by fusing multiple image features 606 for feature assessment and classification. Selection of the image features of interest may be based on classification performance (e.g., in a training data set). Further, a sliding window is applied to select a wavelength range of interest for detecting a particular egg characteristic. Selection of the wavelength range of interest may be based on classification performance (e.g., in a training data set). An output generation 608 provides signals defining optimal group of MFIF with a specific size slide window for classification of fertility and gender.

Figure 7:
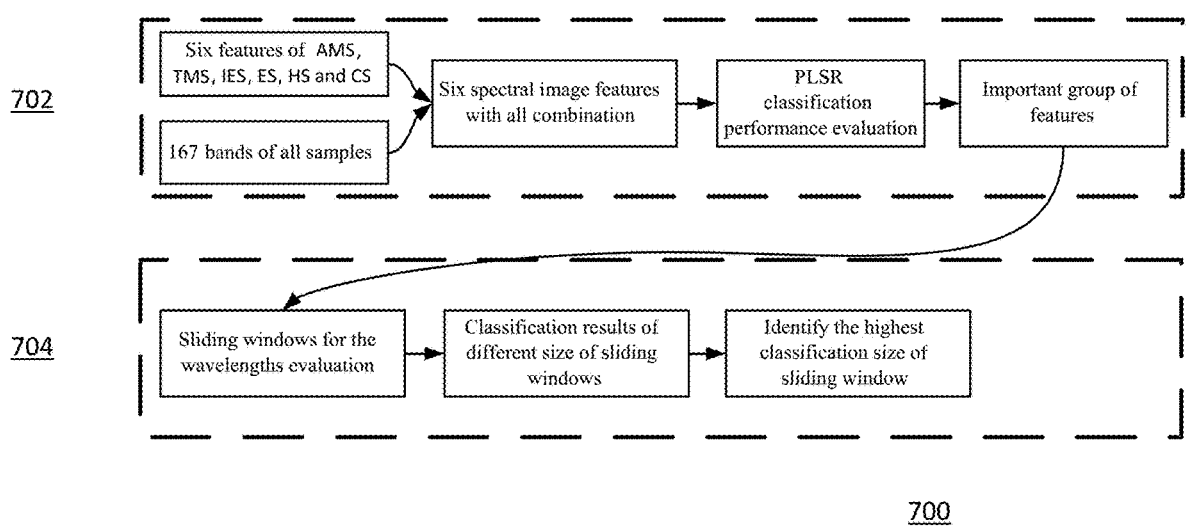
FIG. 7 is a flowchart showing evaluation of groups of image features, and evaluation of different wavelength ranges, exemplary of an embodiment.

FIG. 7 illustrates a flowchart 700 of selection of groups of image features, and selection of wavelength ranges in two steps, exemplary of an embodiment. At 702, the processor processes the spectral images obtained from imaging system 50, i.e., for all wavelengths (167 bands) as described herein.

In an embodiment, six features (AMS, TMS, IES, ES, HS and CS) are extracted for each of the spectral images (in all bands), and the features are grouped according to different combinations. Each combination of features is applied as inputs into the PLSR model to evaluate classification performance. The combination of features that provides the best performance may be selected as the group of image features of interest. Example classification performance results for different groups of image features are disclosed below in Table 2 and Table 5.

As illustrates, at 704, the group of image features of interest identified in the first step are combined with sliding window processing to determine the wavelength range of interest. So, different sizes N of a sliding window (N=10, 30, 50, 80, 167 wavelengths) are defined to evaluate classification performance of each wavelength range. The wavelength range that provides the best performance may be selected as the wavelength range of interest. Example classification performance results for different wavelength ranges are disclosed below in Table 3, Table 4, and Table 6.

Experimental Results

This a non-limiting illustrative example. A total of 336 White shell eggs and 336 Brown shell eggs were received from a commercial fertile chicken egg hatchery in 14 batches (48 eggs per batch) over a period of 3 months (Jul. 12-Oct. 14, 2013). The eggs were laid by 30, 45 and 60 week old birds.

All eggs were imaged by imaging system 50 on Day 0 (just prior to incubation) and immediately after imaging, the eggs were incubated in an Ova-Easy 190Advance Series II Cabinet Incubator (Brinsea Products Inc., Florida, USA) at 37.78° C. (100° F.) and 55% relative humidity. The eggs were automatically turned every hour.

After 10 days of incubation, eggs were candled and broken out to determine fertility and embryo viability. Further, DNA was extracted from the embryonic tissues for Polymerase Chain Reaction (PCR) sequencing to assess gender.

In order to determine gender of the samples, a PCR procedure may be used. The procedure may include DNA extraction from tissue, PCR sample preparation and sequencing, and genotyping.

Figure 8:
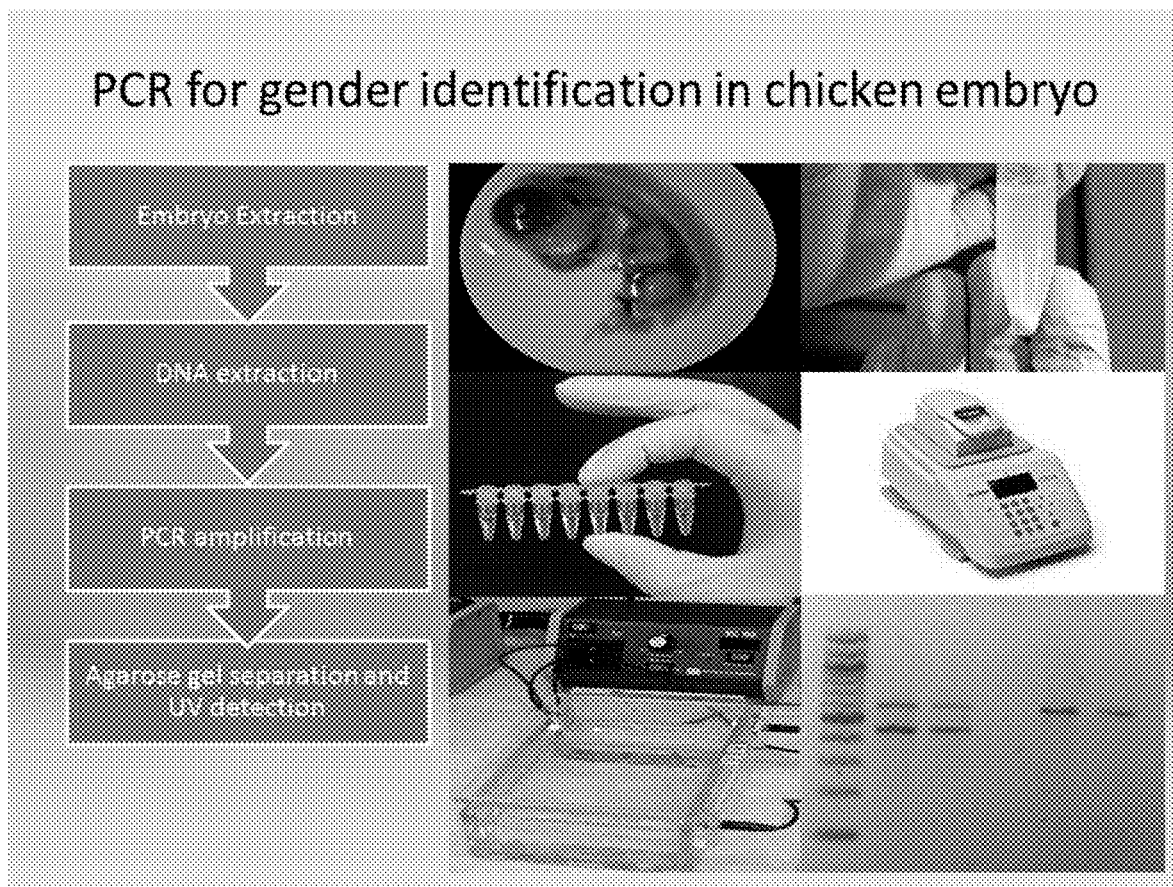
FIG. 8 is a schematic flow diagram of PCR gender identification in a chicken embryo, exemplary of an embodiment.

FIG. 8 shows the experimental set up for the PCR procedure.

Fertility Detection Results

Out of the total (672) number of eggs received, there were two brown eggs and 1 white eggs broken and 2 dead embryos for white eggs.

Table 1 summarises the eggs fertility information.

TABLE 1

Egg Samples used in the study

| Eggs | Eggs received | Eggs available | Fertile | Infertile | Broken | Dead embryo |
|---|---|---|---|---|---|---|
| Brown | 336 | 334 | 311 (93.11%) | 23 | 2 | 0 |
| White | 336 | 333 | 312 (93.69%) | 21 | 1 | 2 |

Figure 9A:
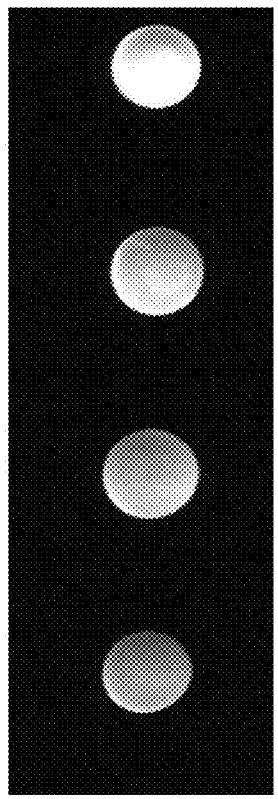
FIGS. 9A and 9B are example spectral images of brown and white eggs, respectively, at a given wavelength (1076 nm), exemplary of an embodiment.
Figure 9B:
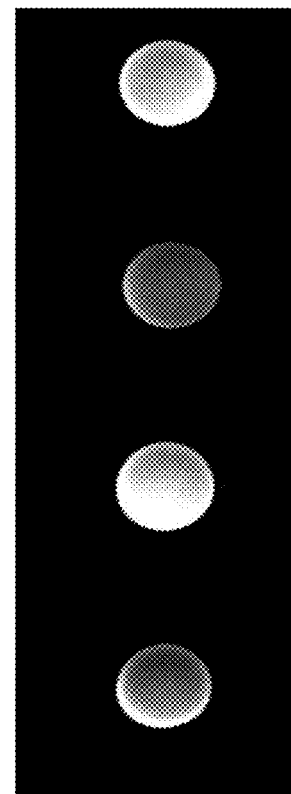
Figure 10A:
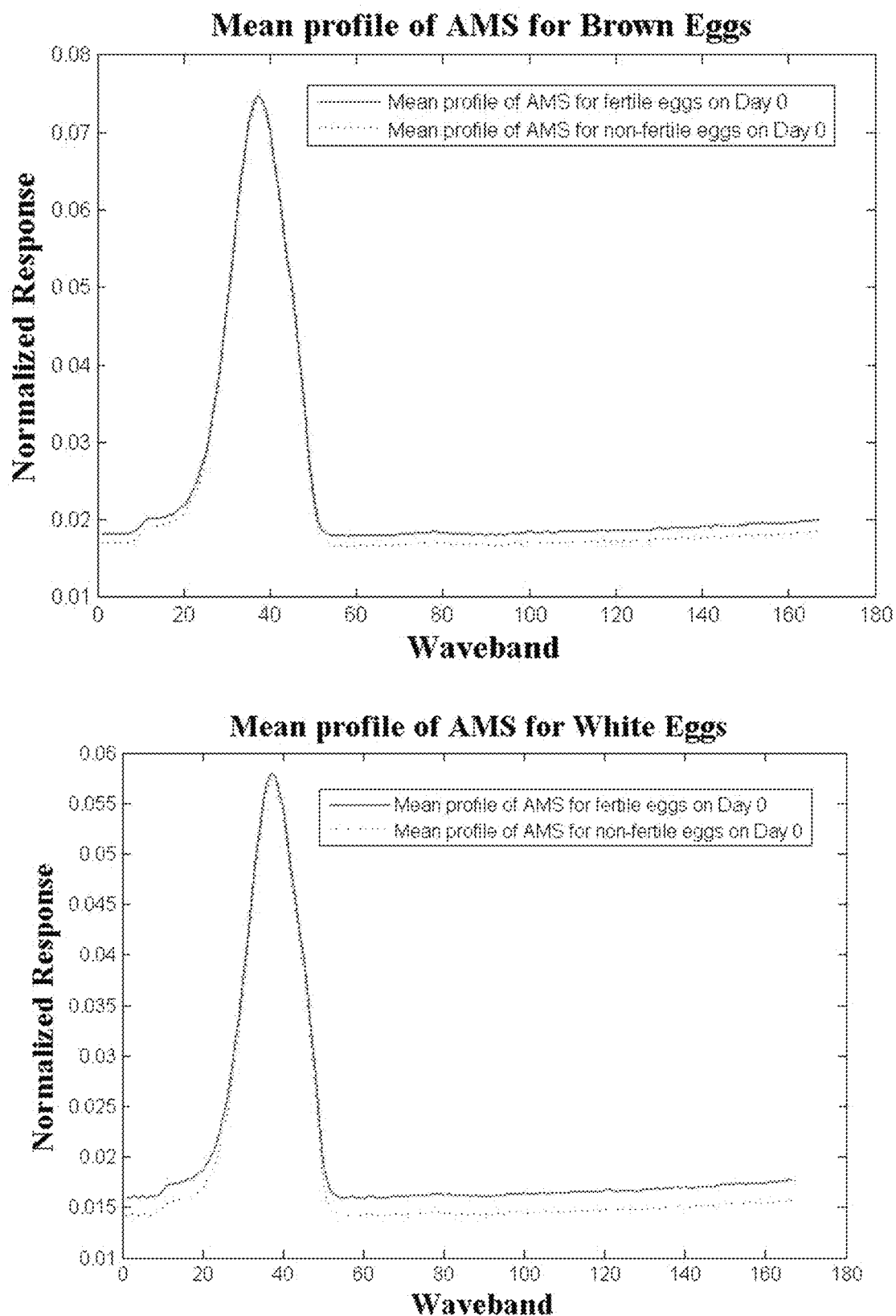
Figure 10B:
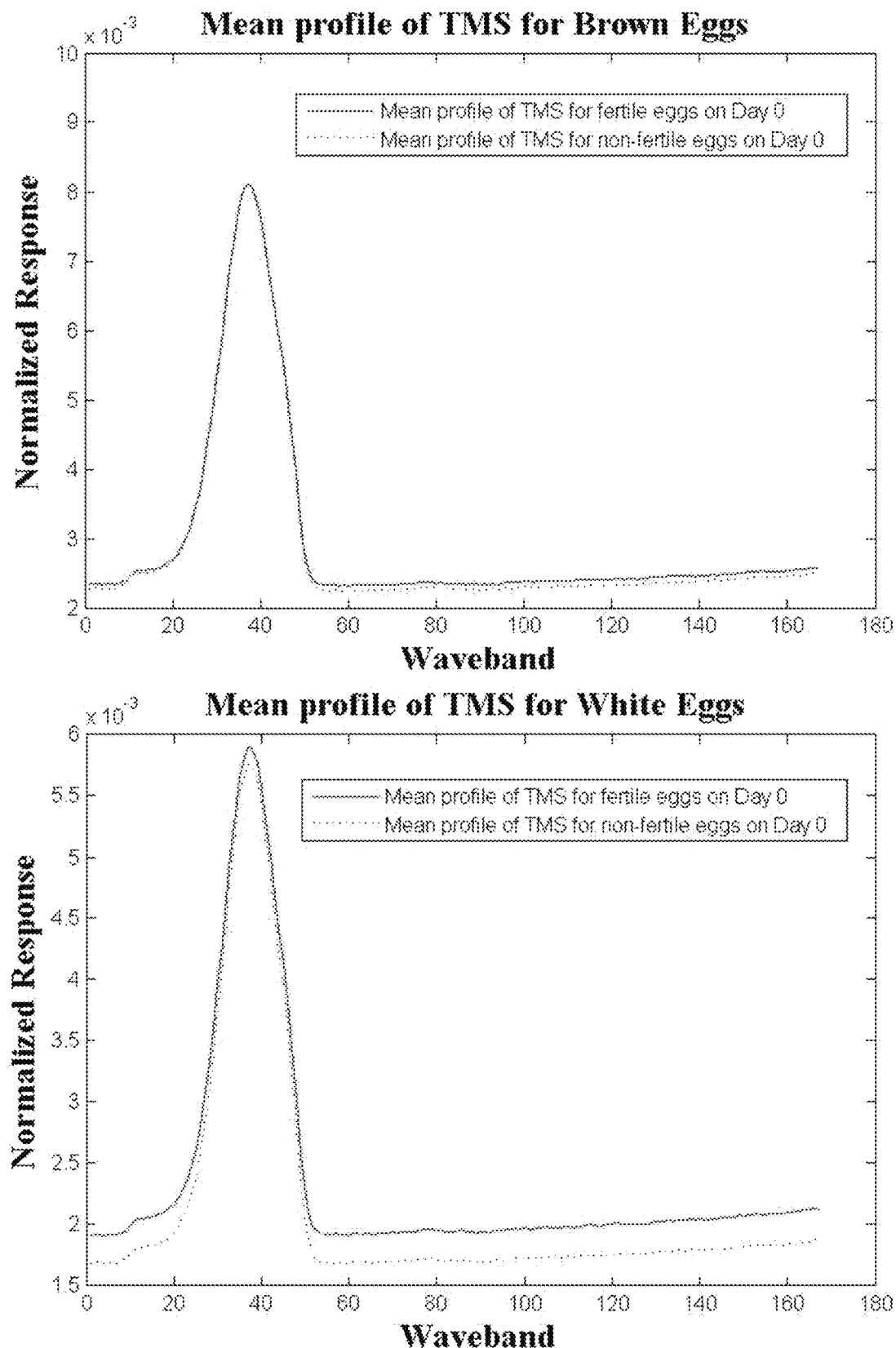
Figure 10C:
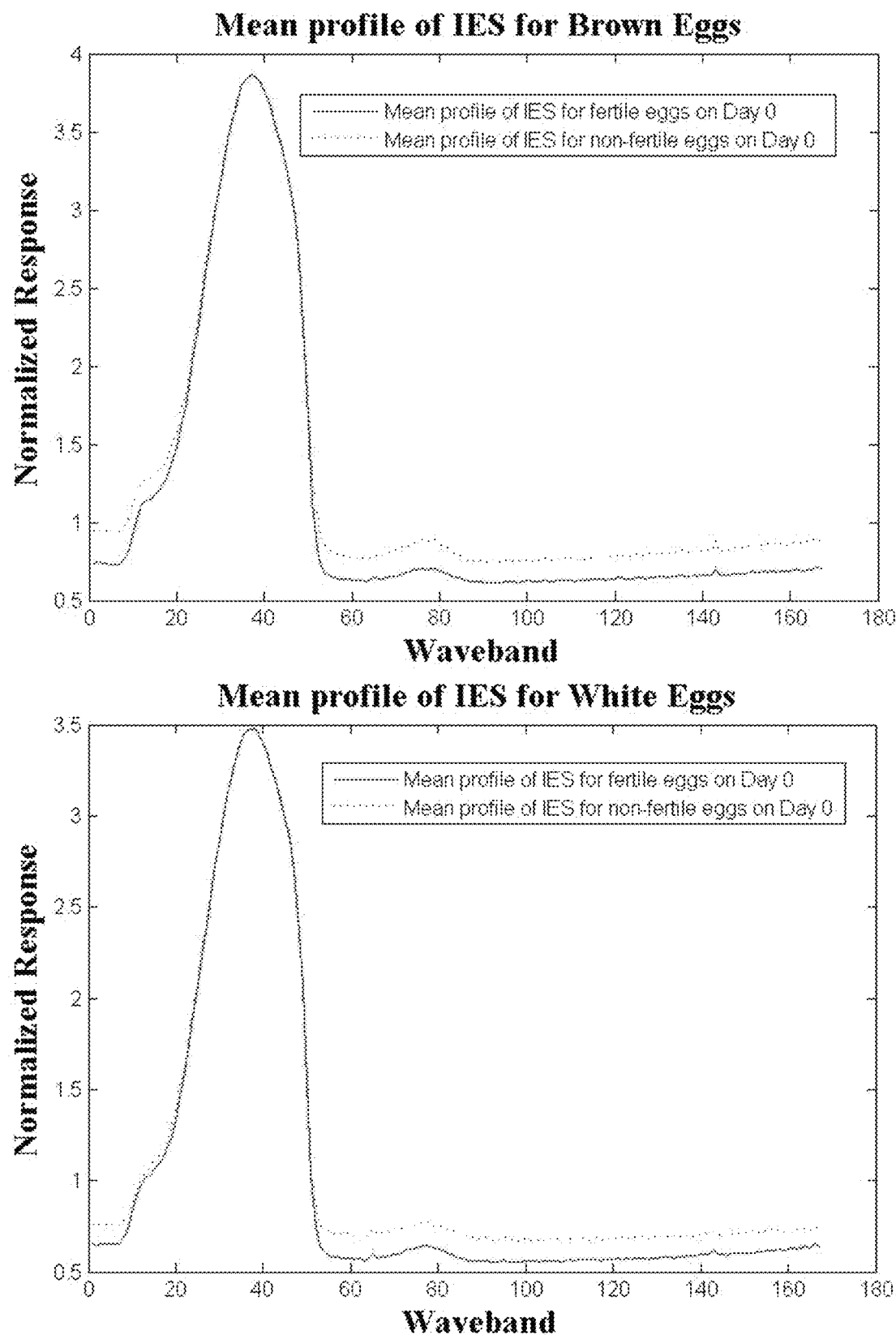
Figure 10D:
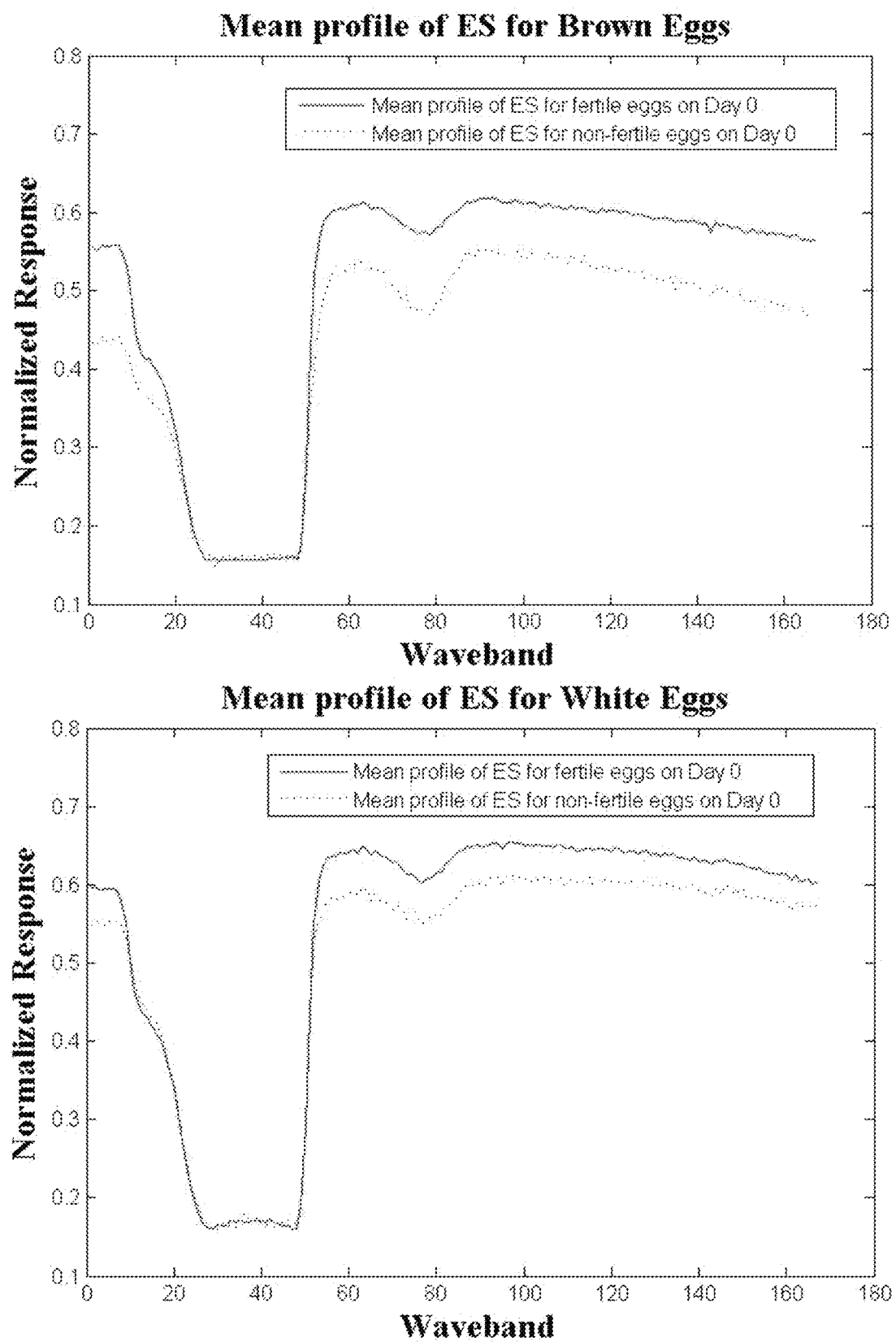
Figure 10E:
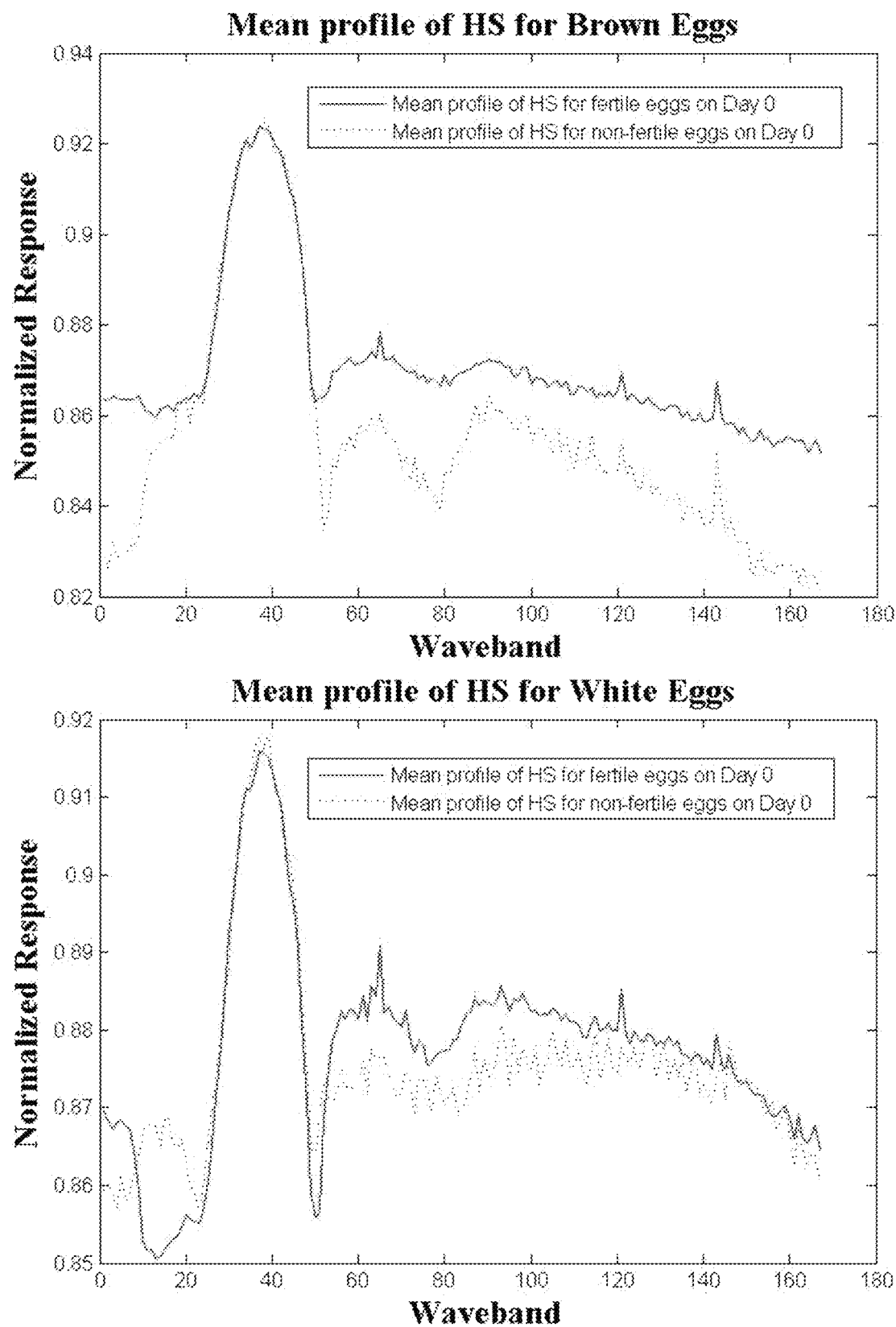
Figure 10F:
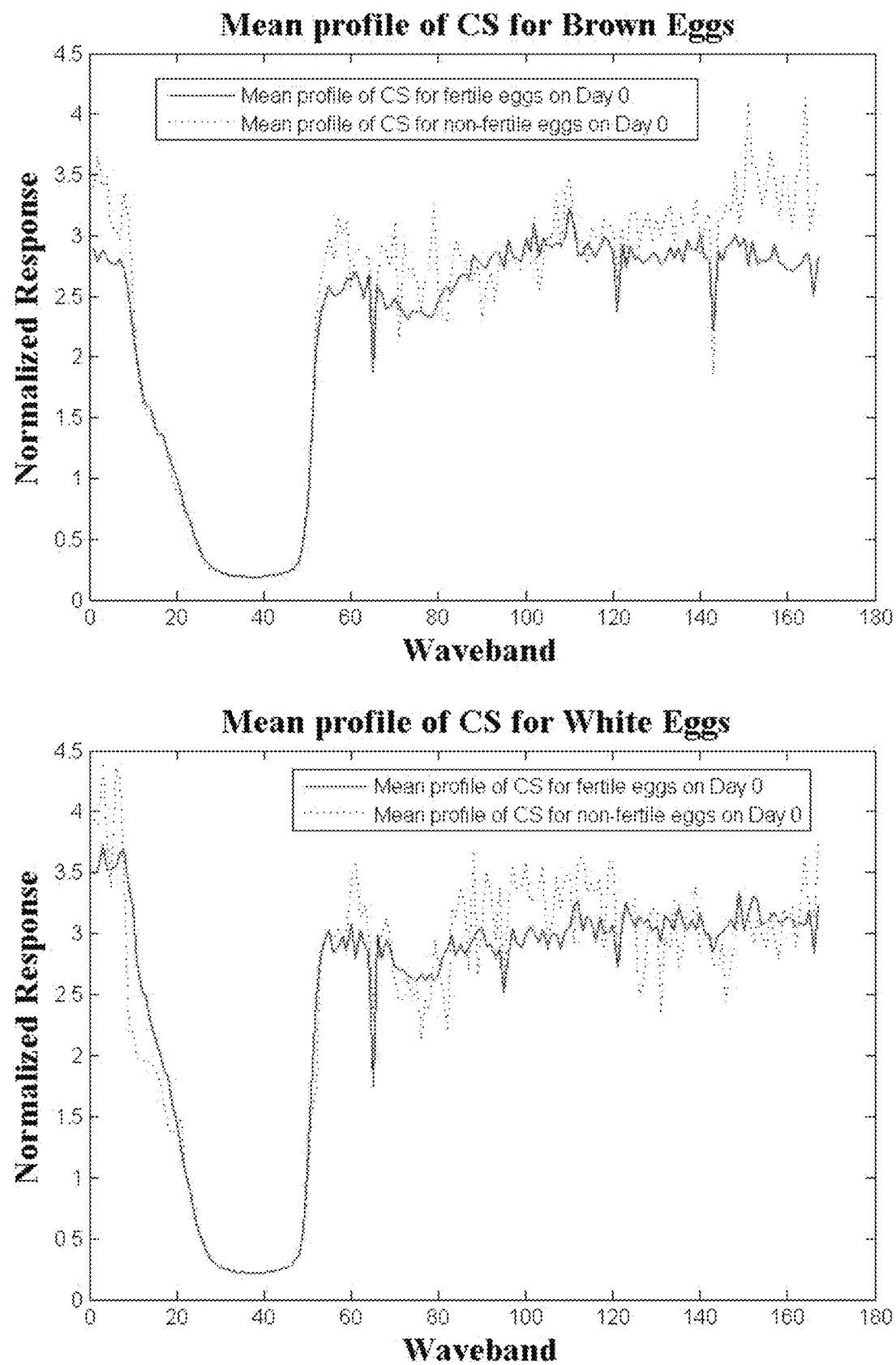
Figure 11A:
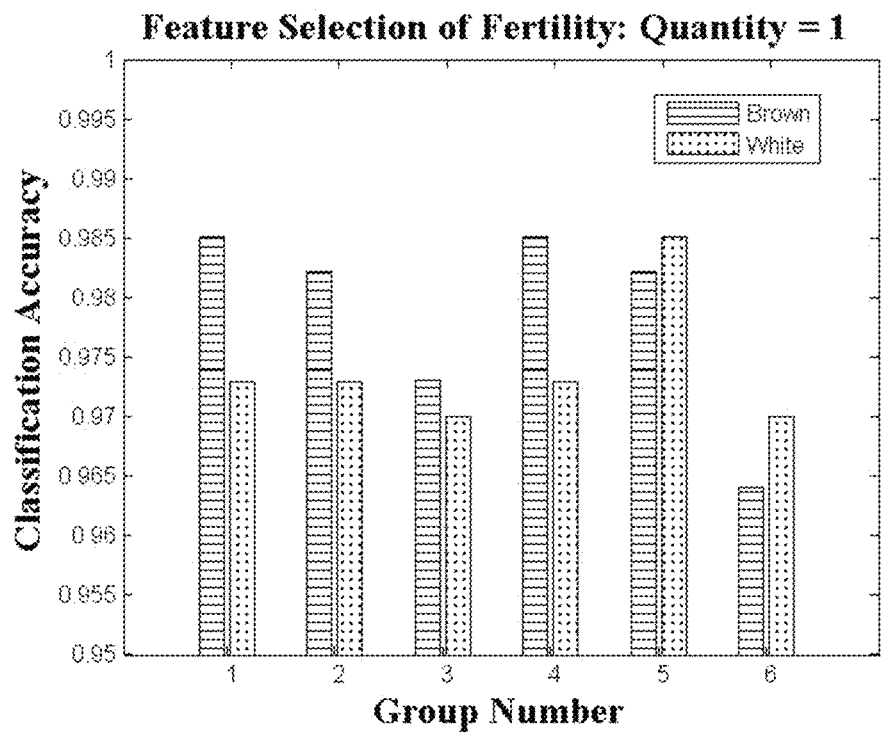
FIGS. 11A, 11B, 11C, 11D, 11E, and 11F are graphs showing evaluation results for different groups of image features, for fertility of brown and white eggs.
Figure 11B:
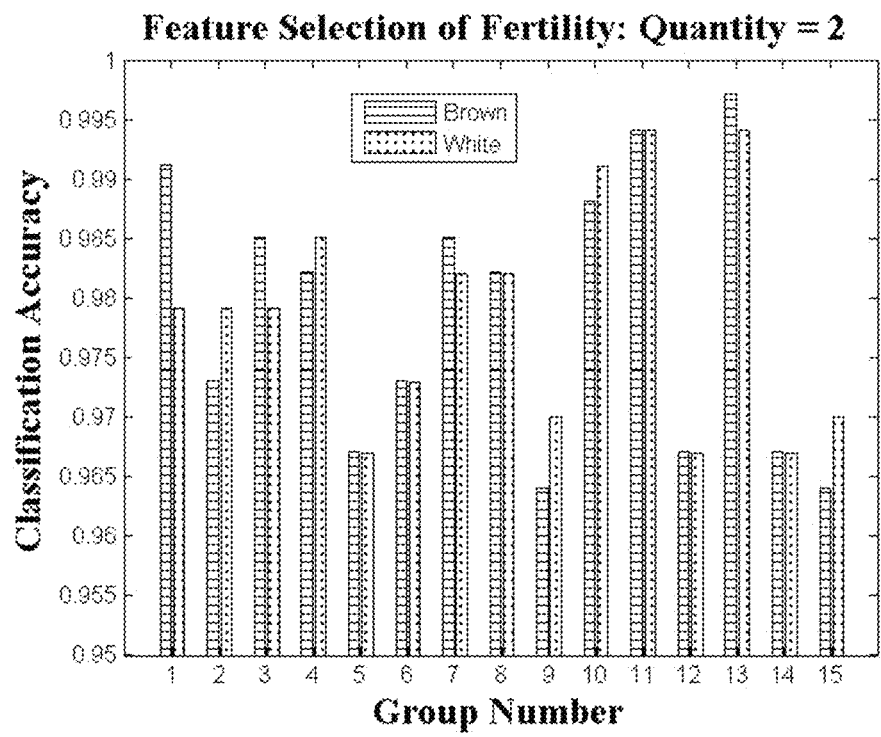
Figure 11C:
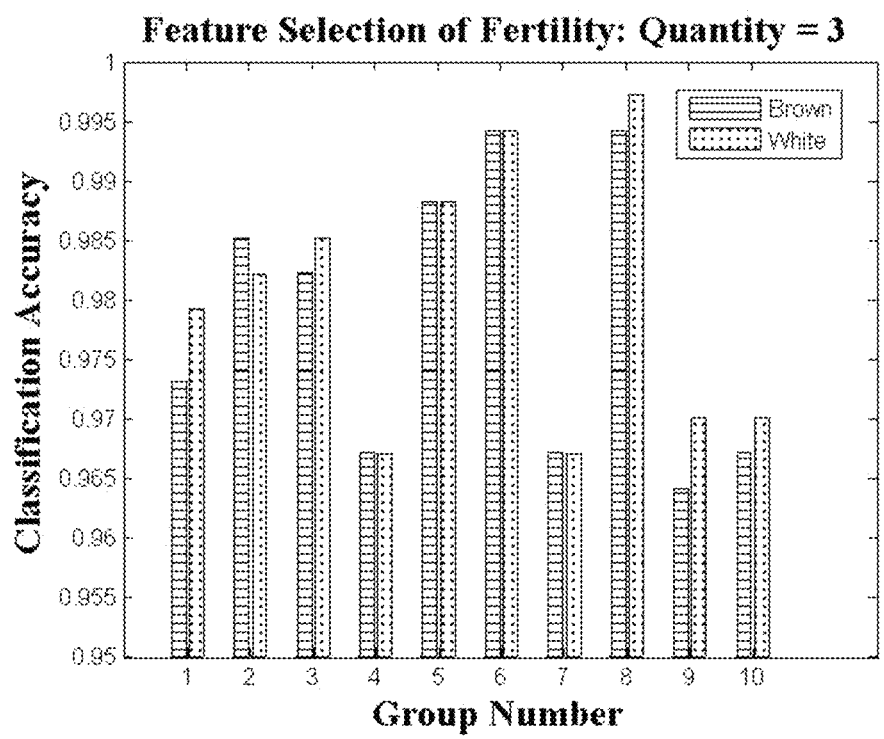
Figure 11D:
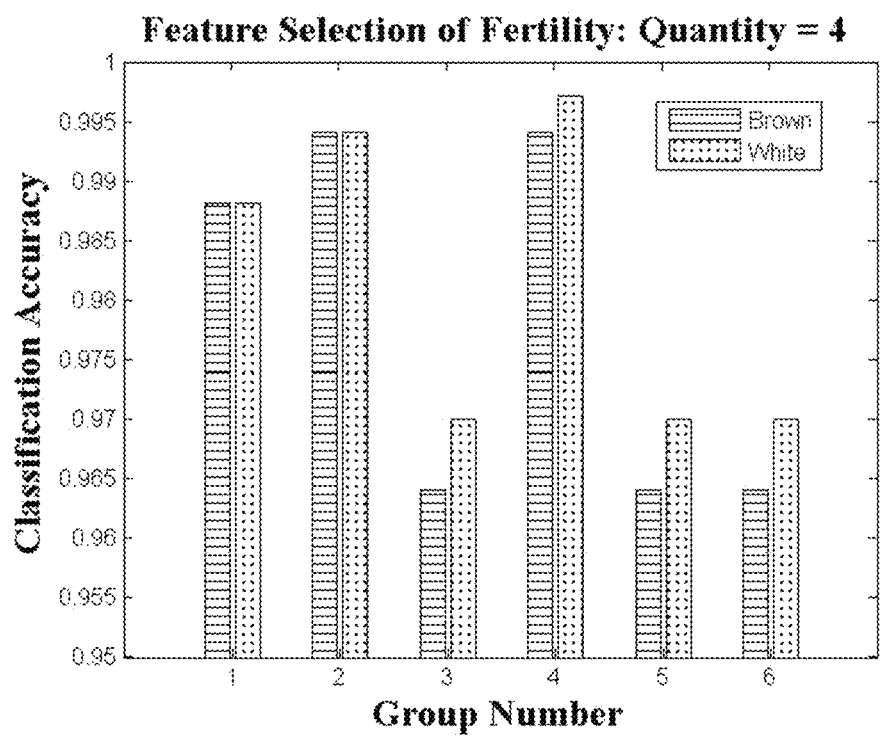
Figure 11E:
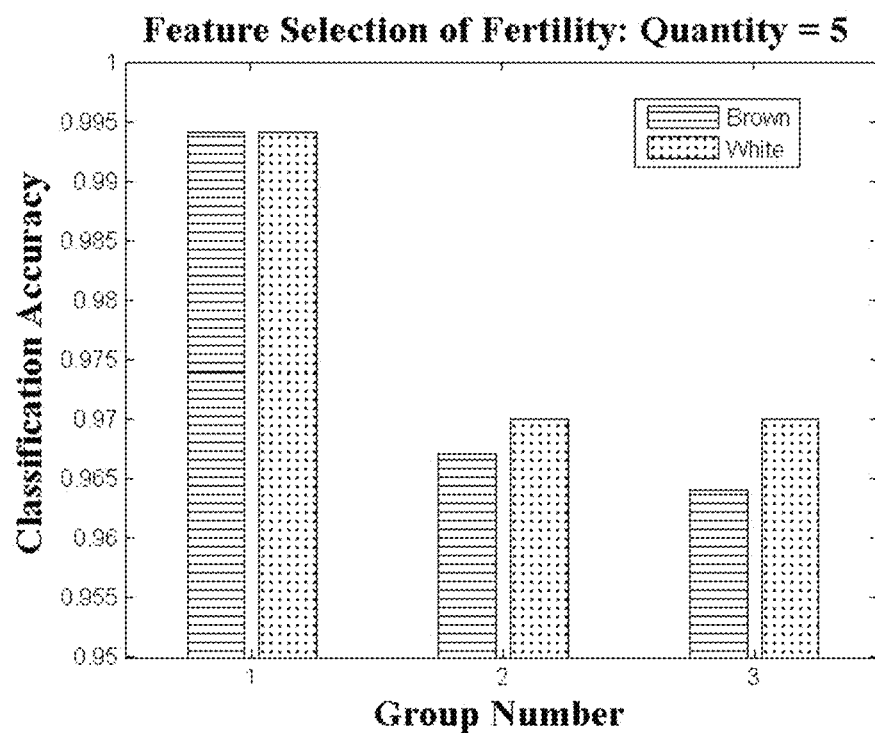
Figure 11F:
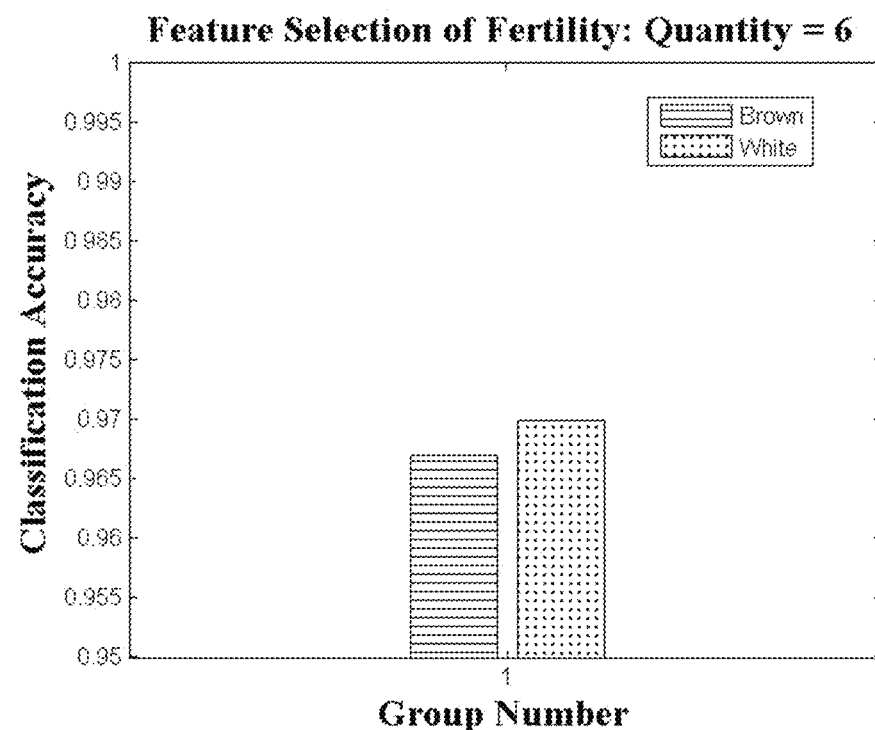
Figure 12A:
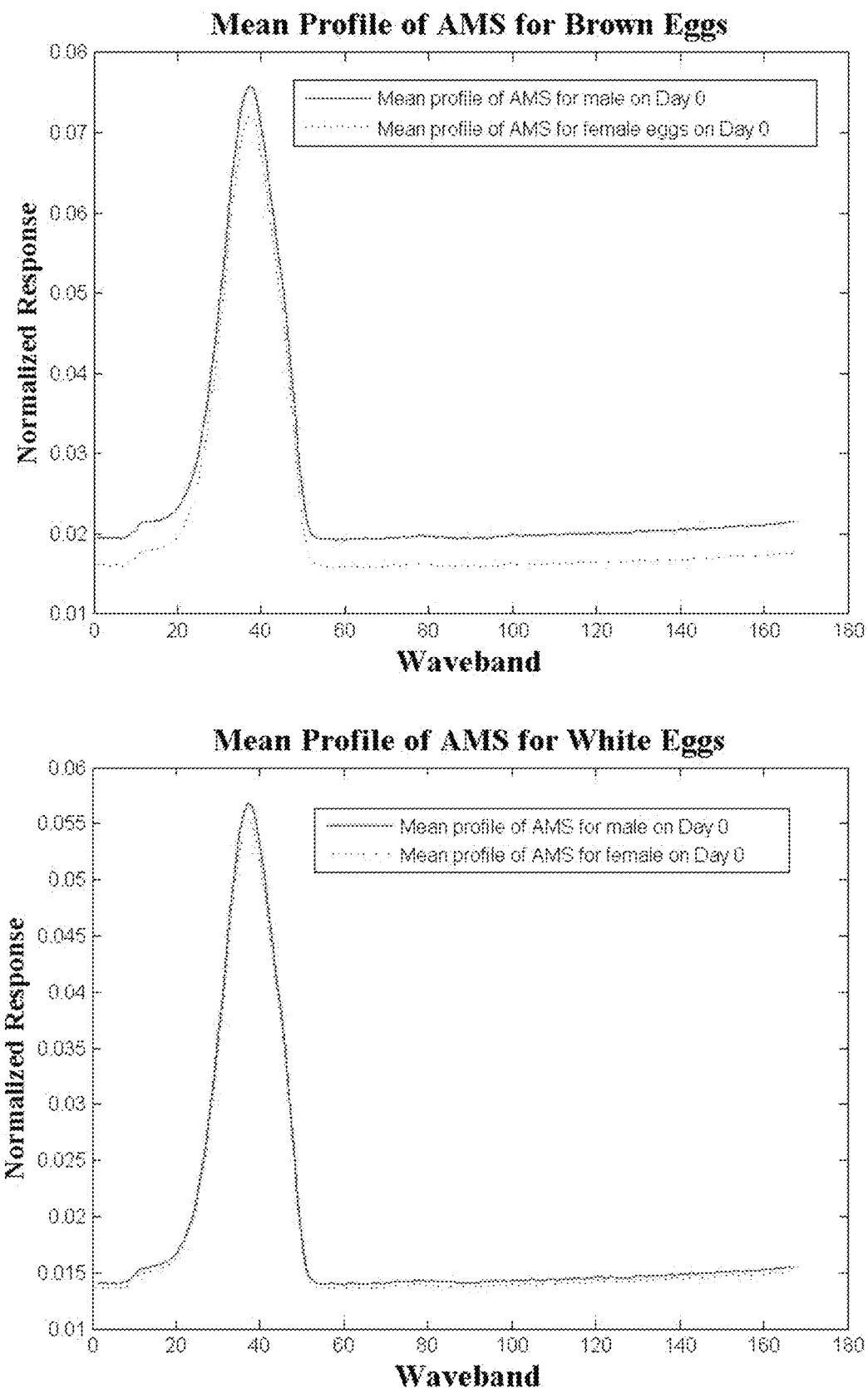
FIGS. 12A, 12B, 12C, 12D, 12E, and 12F are mean profiles of spectral image features for gender of brown and white eggs.
Figure 12B:
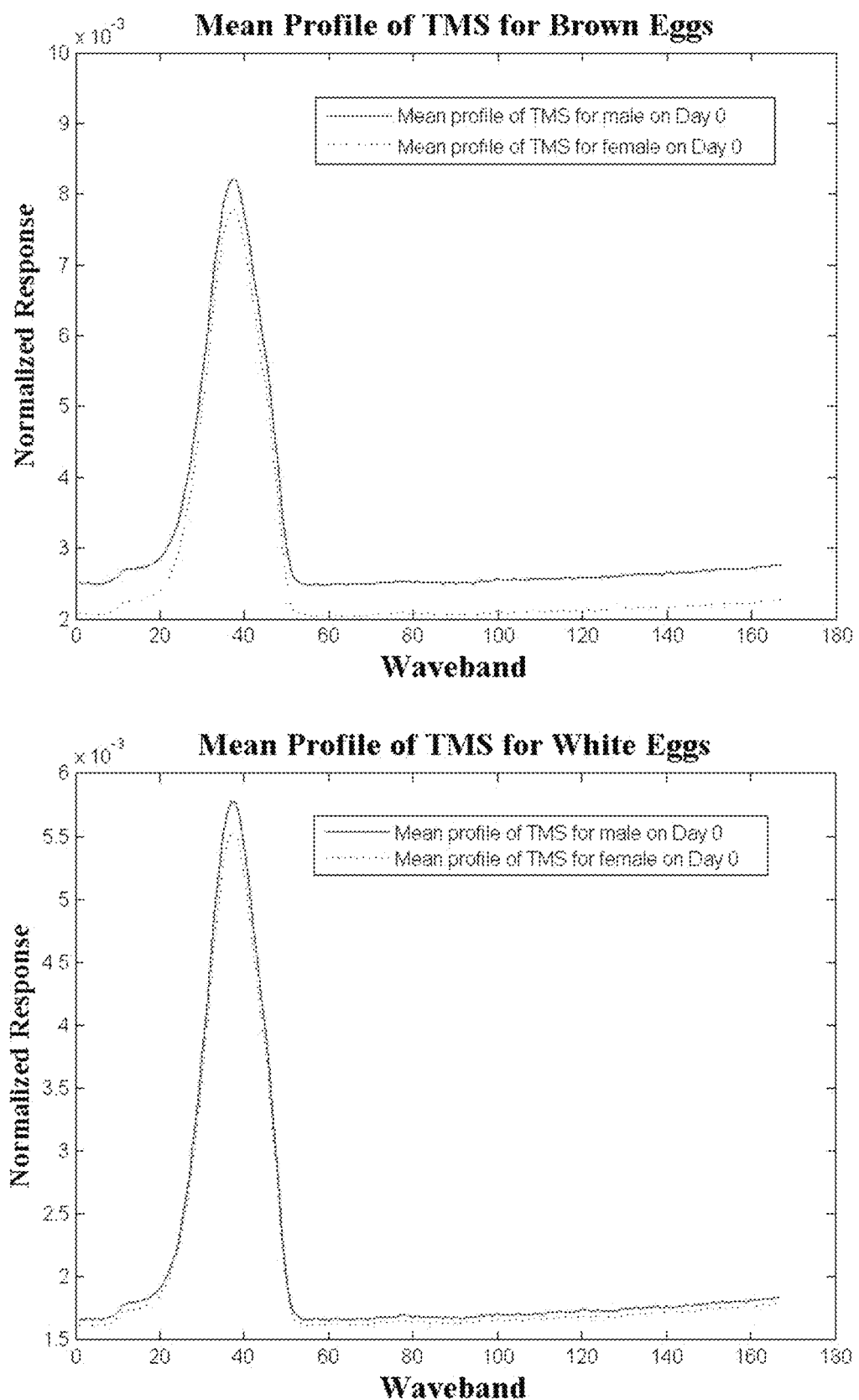
Figure 12C:
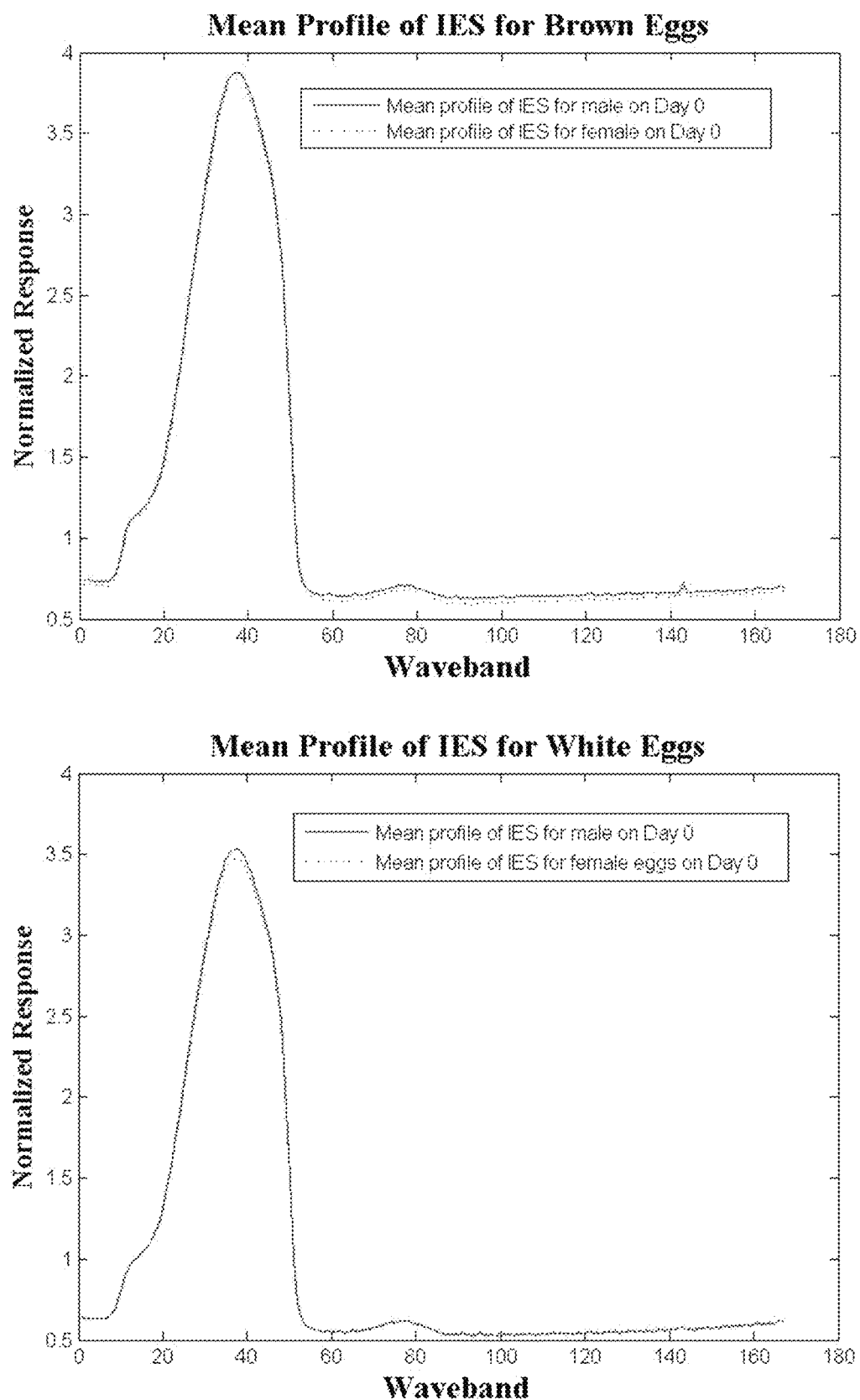
Figure 12D:
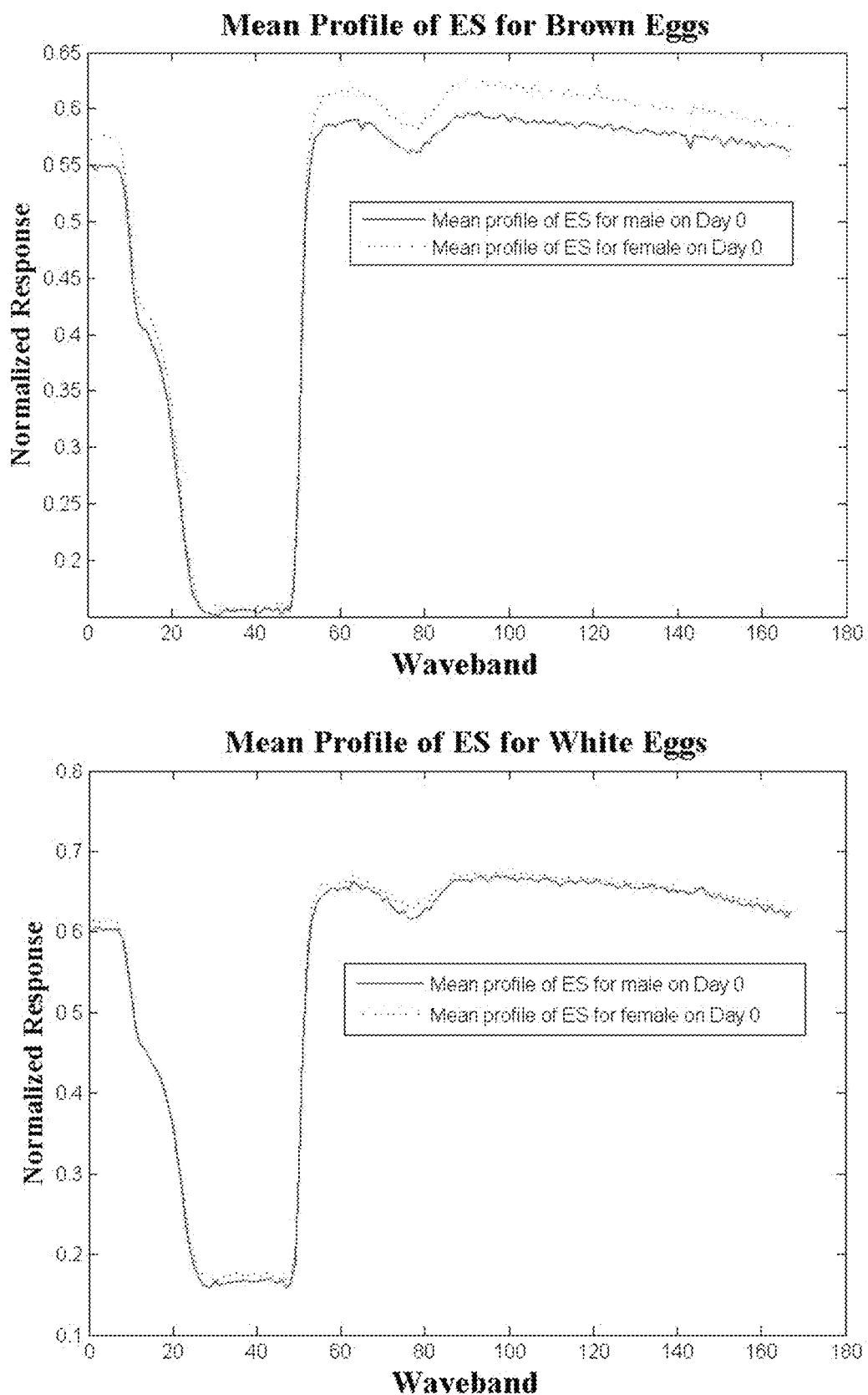
Figure 12E:
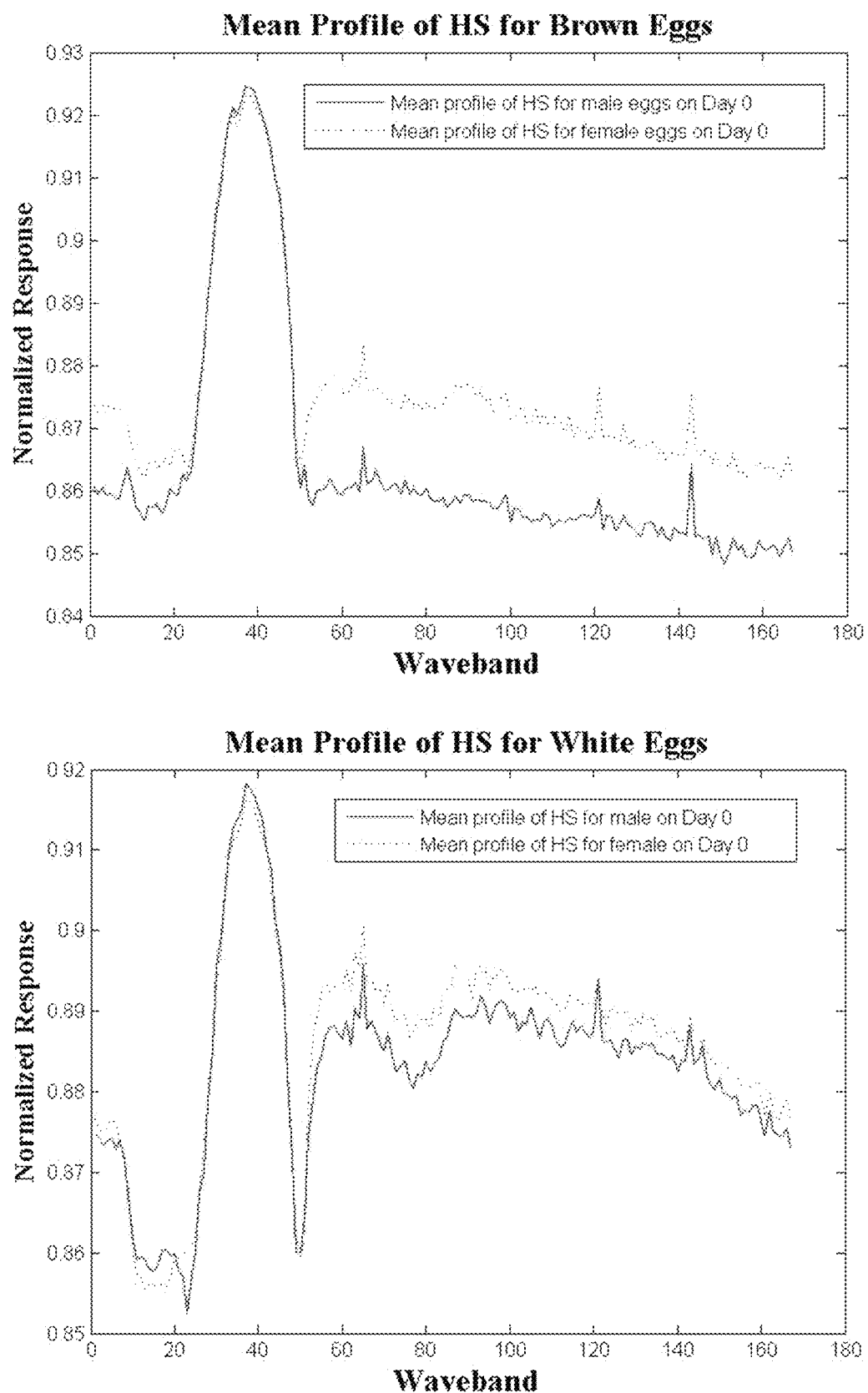
Figure 12F:
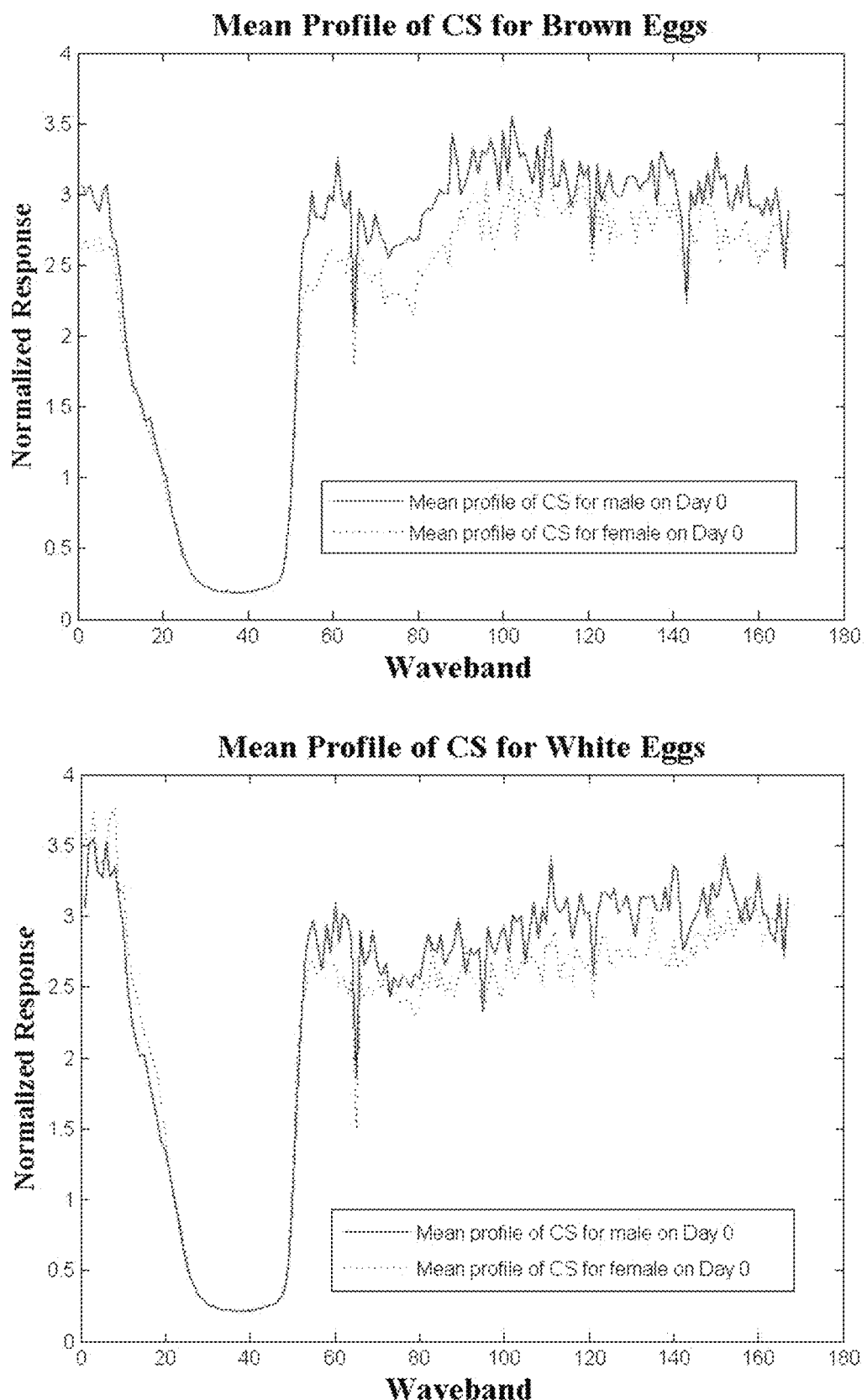
Figure 13A:
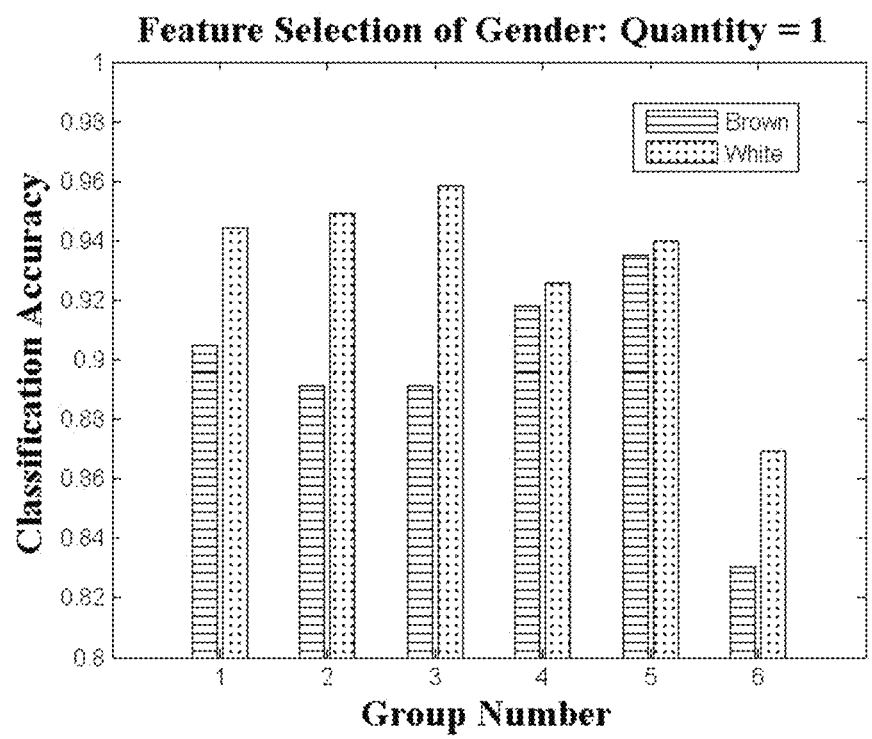
FIGS. 13A, 13B, 13C, 13D, 13E, and 13F are graphs showing evaluation results for different groups of image features, for gender of brown and white eggs.
Figure 13B:
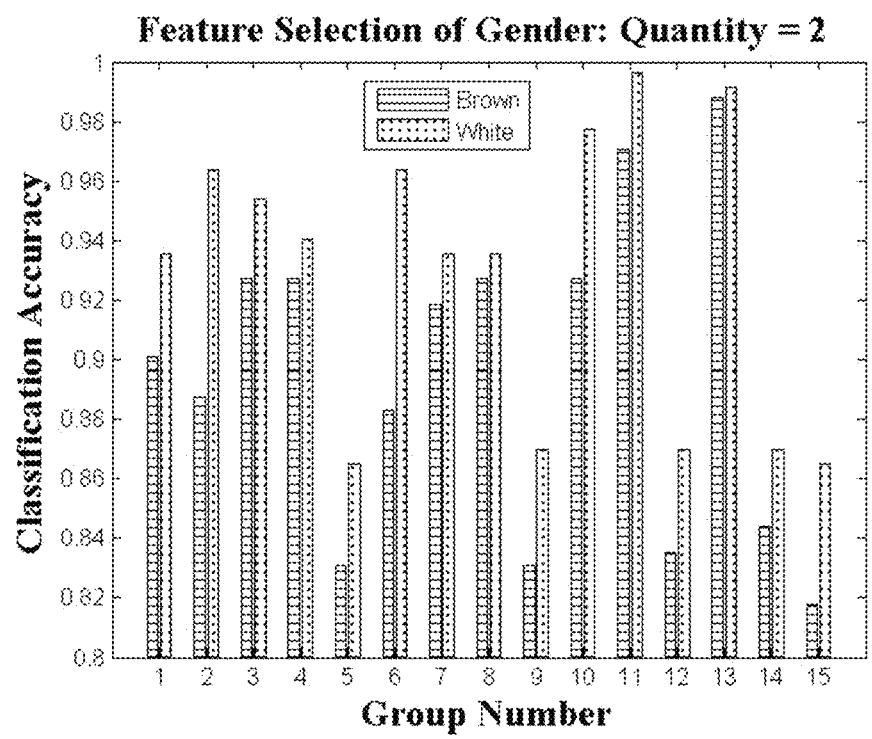
Figure 13C:
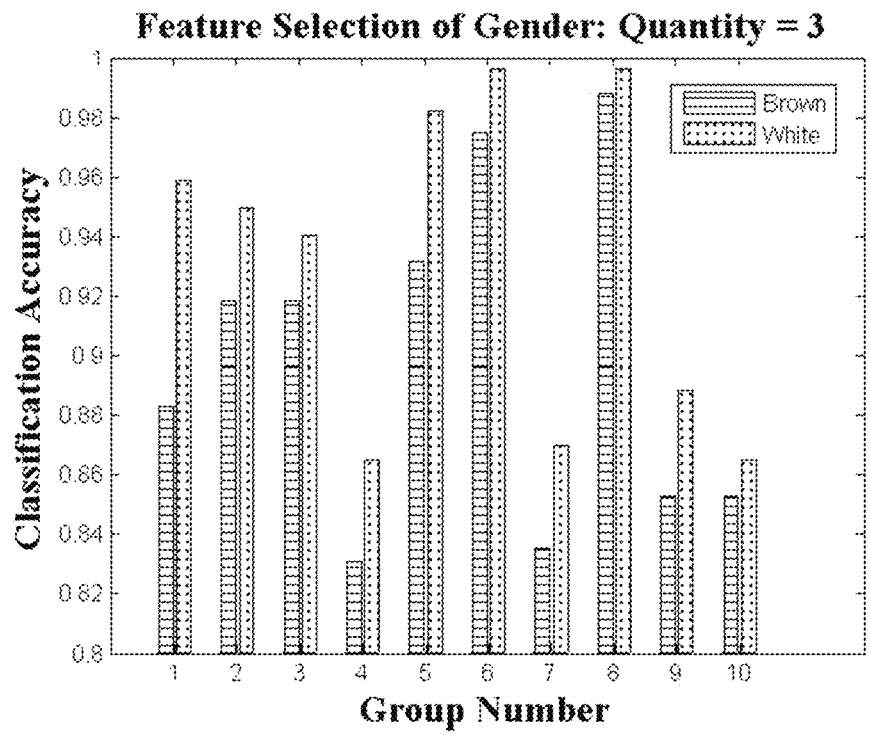
Figure 13D:
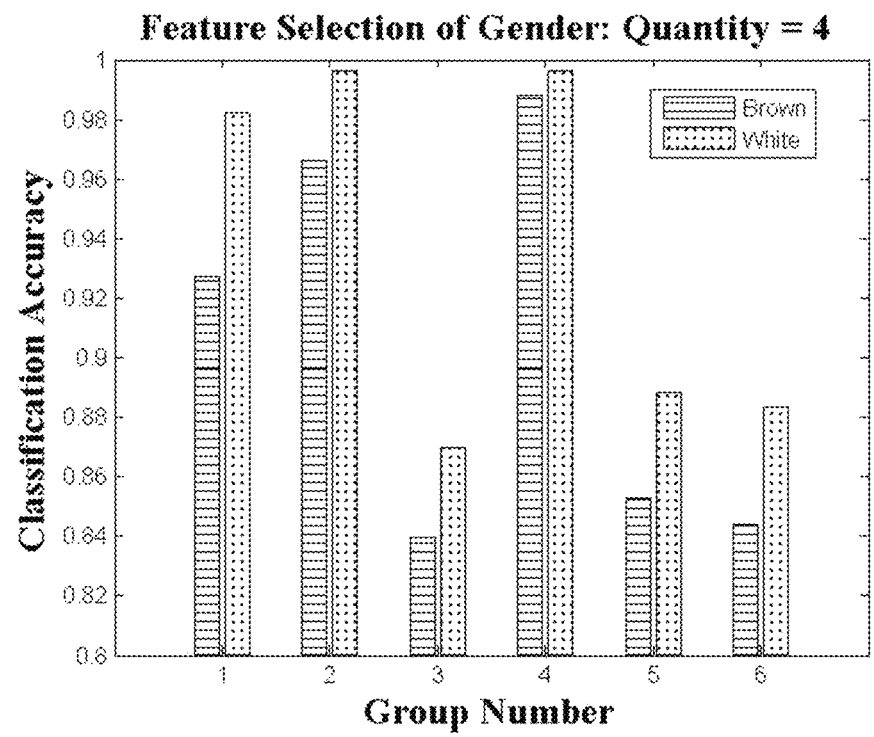
Figure 13E:
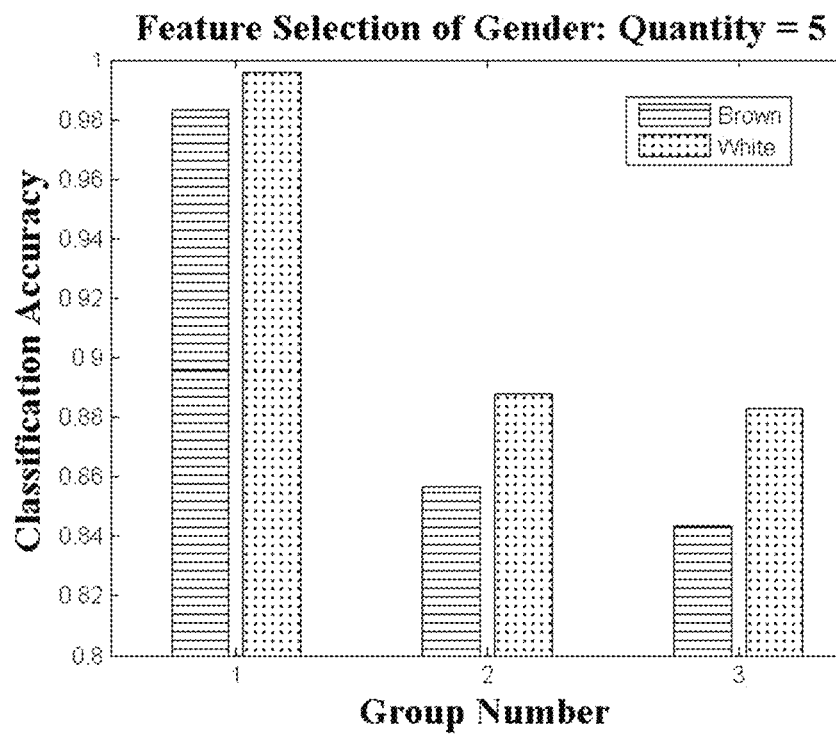
Figure 13F:
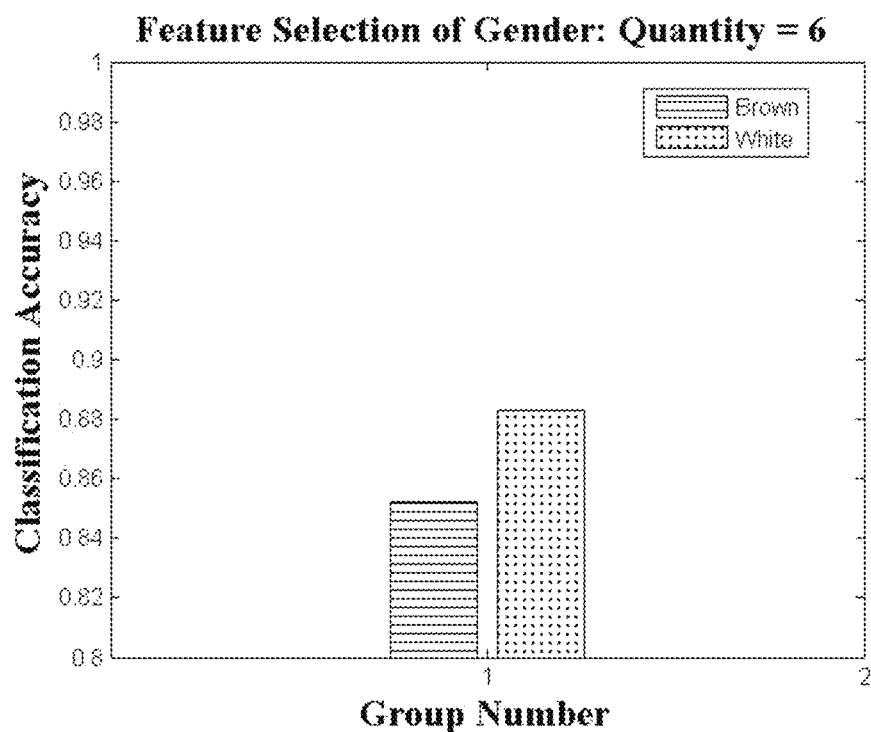

FIGS. 9A and 9B show illustrative example spectral images obtained for both white and brown eggs. The mean profiles of spectral image features, i.e., AMS, TMS, ES, CS, HS and IES are shown for brown and white eggs in FIGS. 10A to 10F. There were large deviations in the spectral image features between fertile and non-fertile eggs at certain specific wavelength ranges. As will be appreciated, data in such wavelength ranges may be particularly useful to separate the 2 different groups, i.e., fertile and non-fertile eggs.

The classification accuracy for egg fertility varied depending on the images features that were used, as shown in FIGS. 11A to 11F. Classification accuracy when one image feature was used ranged from 96.5 to 98.5%. Brown eggs showed higher accuracy compared to white eggs. The lowest accuracy was obtained with feature quantity number of 6 (i.e. features number=6) of group 1 (1 combination for 6 features in total 6) where a quantity number of 3 (features number=3) of group 8 (15 different combination for 3 features in total 6) feature yielded the highest classification accuracy. As shown, the use of multiple fused image features may provide improved classification accuracy.

Table 2 shows that combining 2 features namely feature 4 and 5 resulted in the highest classification accuracy 99.7% for brown eggs whereas combining either 3 features (feature 3, 4, and 5) or 4 features (feature 2, 3, 4, and 5) also contributed the highest classification accuracy of 99.7% for white eggs.

TABLE 2

Highest Classification Accuracy of spectral image features for fertility including brown and white eggs. (Wavelength quantity = 167)

| Feature Quantity | Brown Eggs Accuracy (%) | Feature Group | White Eggs Accuracy (%) | Feature Group |
|---|---|---|---|---|
| 1 | 98.5 | 1 | 98.5% | 5 |
|   |      | 4 |        |   |
| 2 | 99.7% | 4, 5 | 99.4% | 3, 5 |
|   |       |      |       | 4, 5 |
| 3 | 99.4% | 2, 3, 5 | 99.7% | 3, 4, 5 |
|   |       | 3, 4, 5 |       |         |
| 4 | 99.4% | 1, 2, 3, 5 | 99.7% | 2, 3, 4, 5 |
|   |       | 2, 3, 4, 5 |       |            |
| 5 | 99.4% | 1, 2, 3, 4, 5 | 99.4% | 1, 2, 3, 4, 5 |
| 6 | 96.71% | 1, 2, 3, 4, 5, 6 | 97% | 1, 2, 3, 4, 5, 6 |

Spectral image features:
1—Arithmetic Mean Spectral image features, AMS
2—Trim Mean Spectral image features, TMS
3—Information Entropy Spectral image features, IES
4—Energy Spectral image features, ES
5—Homogeneity Spectral image features, HS
6—Contrast Spectral image features, CS A sliding window processing technique may be applied to obtain the highest sensitive range of wavelength for classification of fertility for both brown and white eggs. Firstly, several defined size of sliding windows with range from 10 to 167 (i.e. 10 means each sliding window contains 10 wavelengths) were combined. Table 3 and 4 show that combination of feature 3, 4 and 5 have the highest classification accuracy with window size of 80 for both brown of 99.4% and white of 100% shell eggs.

TABLE 3

Results for fertility including brown and white eggs (Homogeneity + Energy + Entropy*)

| Egg | Window size | Starting band for the highest results | Accuracy | Mis-classified samples |
|---|---|---|---|---|
| Brown** | 10 | 54/74/75/76/148/149 | 93.71 | 21 |
|   | 30 | 112/113 | 96.71 | 11 |
|   | 50 | 58 | 98.8 | 4 |
|   | 80 | 52-57, 76-78 | 99.4 | 2 |
|   | 167 |   | 99.4 | 2 |
|   | 50 | 5/9/11/17/20 | 99.1 | 3 |
| White*** | 10 | 97/100/104/144/153/156 | 94.29 | 18 |
|   | 30 | 75 | 97.6 | 8 |
|   | 50 | 18-21 | 98.8 | 4 |
|   | 80 | 27-28 | 100 | 0 |
|   | 167 |   | 99.7 | 1 |

*Homogeneity and energy are obtained from GLCM analysis based on the squarized ROI. Entropy is calculated from the squarized ROI directly.
**All recognized as fertility: A = 0.9311
***All recognized as fertility: A = 0.9369

TABLE 4

Results for fertility including brown and white eggs (Energy + Homogeneity, 4 + 5)

| Egg | Window size | Starting band for the highest results | Accuracy | Mis-classified samples |
|---|---|---|---|---|
| Brown** | 10 | 53/72/147-150 | 93.71 | 21 |
|   | 30 | 35, 63-64, 77 | 94.91 | 17 |
|   | 50 | 61 | 97.31 | 9 |
|   | 80 | 25 | 98.8 | 4 |
|   | 167 |   | 99.7 | 1 |
| White*** | 10 | 97/101-104/153-156 | 93.69 | 21 |
|   | 30 | 74 | 96.4 | 12 |
|   | 50 | 52 | 97.9 | 7 |
|   | 80 | 1/3/6/15/19-28 | 99.1 | 3 |
|   | 167 |   | 99.4 | 2 |

*Homogeneity and energy are obtained from GLCM analysis based on the squarized ROI. Entropy is calculated from the squarized ROI directly.
**All recognized as fertility: A = 0.9311
***All recognized as fertility: A = 0.9369

Gender Detection Results

Out of the total number of eggs received, there were 110 male and 120 female brown eggs whereas there were 80 male and 134 female white eggs.

The mean profiles of spectral image features, i.e., AMS, TMS, ES, CS, HS and IES are shown for brown and white eggs from FIGS. 12A to 12F. Large deviations of spectral image features between male and female eggs can be found for the spectral image features in certain wavelength ranges. As will be appreciated, data in such wavelength ranges may be particularly useful to separate the two different groups, i.e., male eggs and female eggs.

The classification accuracy for egg gender varied depending on the images features that were used as shown in FIGS. 13A to 13F. Classification accuracy when one image feature was used ranged from 83.4% to 95.7%. The lowest accuracy was obtained with Quantity number of 6 (features number=6) of group 1 (1 combination for 6 features in total 6) whereas Quantity number of 3 (features number=3) of group 8 (15 different combination for 3 features in total 6) feature yielded the highest classification accuracy. As shown, the use of multiple fused image features may provide improved classification accuracy.

As shown in FIGS. 13A to 13F, evaluation results of different fused image features groups for gender show that feature quantity 2 with group of feature 4 and 5; feature quantity 3 with group of feature 3, 4 and 5; and feature quantity 4 with group of feature 2, 3, 4 and 5; produced the highest classification accuracy 98.7% for brown eggs. Similarly, the feature quantity 2 with group of feature 3, 5; feature quantity 3 with groups of feature 3, 4, 5 and 2, 3, 5, and feature quantity 4 with groups of feature 1, 2, 3, 5; and 2, 3, 4, 5 produce the highest classification accuracy 99.53% for white eggs. Six types based on feature quantity high classification results are listed in Table 5.

TABLE 5

Highest Classification Accuracy of spectral image features for gender including brown and white eggs. (Wavelength quantity = 167)

| Feature Quantity | Brown Eggs Accuracy (%) | Feature Group | White Eggs Accuracy (%) | Feature Group |
|---|---|---|---|---|
| 1 | 93.48 | 5 | 95.79 | 3 |
| 2 | 98.7 | 4, 5 | 99.53 | 3, 5 |
| 3 | 98.7 | 3-4-5 | 99.53 | 2, 3, 5 |
|   |   |   |   | 3, 4, 5 |

TABLE 5-continued

Highest Classification Accuracy of spectral image features for gender including brown and white eggs. (Wavelength quantity = 167)

| Feature | Brown Eggs | | White Eggs | |
| --- | --- | --- | --- | --- |
| Quantity | Accuracy (%) | Feature Group | Accuracy (%) | Feature Group |
| 4 | 98.7 | 2-3-4-5 | 99.53 | 1, 2, 3, 5 2, 3, 4, 5 |
| 5 | 98.26 | 1, 2, 3, 4, 5 | 99.53 | 1, 2, 3, 4, 5 |
| 6 | 85.22 | 1, 2, 3, 4, 5, 6 | 88.32 | 1, 2, 3, 4, 5, 6 |

Spectral image features:
1— Arithmetic Mean Spectral image features, AMS
2—Trim Mean Spectral image features, TMS
3—Information Entropy Spectral image features, IES
4—Energy Spectral image features, ES
5—Homogeneity Spectral image features, HS
6—Contrast Spectral image features, CS A sliding window processing technique may be applied to obtain highest sensitive range of wavelength for classification of fertility for both brown and white eggs. Example results are shown in Table 6.

TABLE 6

Results for gender including brown and white eggs (Homogeneity + Energy + Entropy*)

| Egg | Window size | Starting band for the highest results | Accuracy (%) |
| --- | --- | --- | --- |
| Brown** | 10 | 85 | 69.13 |
| | 30 | 60/74/77/79 | 83.04 |
| | 50 | 64 | 92.17 |
| | 80 | 1/25/28/29 | 95.65 |
| | 167 | | 98.7 |
| White*** | 10 | 27 | 73.83 |
| | 30 | 17/27 | 86.45 |
| | 50 | 27 | 93.93 |
| | 80 | 1 | 100 |
| | 167 | | 99.53 |

*Homogeneity and energy are obtained from GLCM analysis based on the squarized ROI. Entropy is calculated from the squarized ROI directly.
**All recognized as Gender: A = 0.5217
***All recognized as Gender: A = 0.6261

The results showed that there were no significant differences in classification accuracy between brown and white eggs when detecting fertility or gender of eggs in manners disclosed herein.

Although experimental have been shown for chicken eggs, the embodiments of the devices, systems, and methods disclosed herein may also be used to detect fertility and/or gender of other types of eggs (e.g., other avian eggs).

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code (e.g., stored in memory 112) is applied to input data (e.g., image data from imaging system 50) to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The foregoing discussion provides many example embodiments. Although each embodiment represents a single combination of inventive elements, other examples may include all possible combinations of the disclosed elements. Thus, if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a nonvolatile or non-transitory storage medium, which can be a compact disk read-only memory (CD-ROM), USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps As can be understood, the examples described above and illustrated are intended to be exemplary only. The scope is indicated by the appended claims.

What is claimed is:

1. A device for detecting a characteristic of an unhatched egg, the device comprising:
    a transceiver configured to receive a set of spectral images of an unhatched egg, each of the spectral images obtained in a particular wavelength range, the set of spectral images forming a three-dimensional data cube;
    a feature extractor configured to:
        combine a first selected subset of the set of spectral images into a first fused image, the first selected subset comprising a different subset than all of the received set of spectral images; and
        process the first fused image to extract image features, the image features including image texture features that describe spatial and spectral information of the first fused image or a region of the first fused image, the image texture features including an image texture feature having information associated with a spatial distribution of tonal variations within the particular wavelength range; and
    a classifier configured to process the extracted image features to classify the unhatched egg according to at least one characteristic selected from the group of gender of the unhatched egg and fertility of the unhatched non-incubated avian egg;
    wherein the transceiver is configured to transmit data signals of results of the classified unhatched egg.

2. The device as claimed in claim 1, wherein:
    the feature extractor is configured to:
        combine a second selected subset of the set of spectral images into a second fused image, the second selected subset comprising a different subset than all of the received set of spectral images; and
        process the second fused image, the image features including image texture features that describe spatial and spectral information of the respective first or second fused image or a region of the respective first or second fused image, the image features including an image texture feature having information associated with a spatial distribution of tonal variations within the particular wavelength range; and
    the classifier is configured to process the extracted image features to classify the unhatched egg according to at least one characteristic, the image features extracted from the set of first and second fused images being classified separately, wherein classification results of the separately classified image features are fused at a decision level by an aggregate classification decision.

3. The device as claimed in claim 2, wherein the feature extractor is configured to combine at least two of the extracted image features into one feature vector.

4. The device as claimed in claim 1, wherein the feature extractor is configured to:
    at least one of:
        combine at least two of the extracted image features into one feature vector;
        select the image features from the first fused image based on at least one of:
            a particular characteristic of the at least one characteristic to be detected; or
            eggshell colour and avian information; and
        process the first fused image to detect regions of interest for filtering egg image data from background image data.

5. The device as claimed in claim 1, wherein said combining the set of images into the first fused image comprises selecting a subset of the images to combine into the first fused image, wherein said selecting the subset of the images is based on at least one of:
    a particular characteristic to be detected; or
    eggshell color and avian information.

6. The device as claimed in claim 1, wherein the classifier is configured to provide an indicator of the at least one characteristic, as classified.

7. The device as claimed in claim 1, wherein:
    at least one of:
        the image features include image texture features as a set of quantitative measures calculated in image processing to describe the spatial and spectral information of the first fused image or a region of the first fused image;
        the image features are selected from the group consisting of at least one first-order image feature and at least one second-order image feature;
        the image texture features comprise a second-order measure that reflects a relationship between neighbouring pixels in the fused image or the region of the fused image;
        the image texture features comprise a set of quantitative measures calculated in image processing designed to describe spatial and spectral information of the fused image or a region of the fused image; or
        the image features are learned by an artificial intelligence system to describe spatial and spectral information of the fused image or a region of the first fused image.

8. The device as claimed in claim 1, further comprising at least one pre-processor configured to:
    at least one of:
        determine that the unhatched egg is a white egg or a brown egg for calibration of an imaging system for generating the set of images; or
        accept laying avian information and eggshell color for calibration of an imaging system for generating the set of images.

9. The device as claimed in claim 1, wherein the data signals of the results transmitted by the transceiver are received at an apparatus and used to actuate the apparatus according to at least one characteristic to make physical contact with the unhatched egg to move or separate the classified unhatched egg based on the at least one characteristic.

10. The device as claimed in claim 1, wherein the set of spectral images of the unhatched egg are generated from an imaging interface for one of:
    a spectrograph and a camera; or
    a hyperspectral imaging device.

11. A computer-implemented method of detecting a characteristic of an unhatched egg, the method comprising:
    receiving, by at least one processor using a transceiver, a set of spectral images of an unhatched egg, each of the spectral images obtained in a particular wavelength range, the set of spectral images forming a three-dimensional data cube;
    combining, by the least one processor, a selected subset of the set of spectral images into a first fused image, the selected subset comprising a different subset than all of the received set of spectral images;

processing, by the at least one processor, the first fused image to extract image features, the image features including image texture features that describe spatial and spectral information of the first fused image or a region of the first fused image, the image texture features including an image texture feature having information associated with a spatial distribution of tonal variations within the particular wavelength range;

processing, by the at least one processor, the extracted image features to classify the unhatched egg according to at least one characteristic selected from the group consisting of gender of the unhatched egg and fertility of the unhatched egg; and transmitting, by the at least one processor using the transceiver, data signals of results of the classified unhatched egg.

12. The method as claimed in claim 11, comprising:

combining, by the at least one processor, a second selected subset of the set of spectral images into a second fused image, the second selected subset comprising a different subset than all of the received set of spectral images;

processing, by the at least one processor, the first and second fused image, the image features including image texture features that describe spatial and spectral information of the respective first or second fused image or a region of the respective first or second fused image, the image features including an image texture feature having information associated with a spatial distribution of tonal variations within the particular wavelength range; and processing, by the at least one processor, the extracted image features to classify the unhatched egg according to at least one characteristic, the image features extracted from the set of first and second fused images being classified separately, wherein classification results of the separately classified image features are fused at a decision level by an aggregate classification decision.

13. The method as claimed in claim 12, comprising combining, by the at least one processor, at least two of the extracted image features into one feature vector.

14. The method as claimed in claim 11, comprising:
at least one of:
combining, by the at least one processor, at least two of the extracted image features into one feature vector;
selecting, by the at least one processor, the image features from the first fused image based on at least one of:
a particular characteristic of the at least one characteristic to be detected; or
eggshell colour and avian information; and
processing, by the at least one processor, the first fused image to detect regions of interest for filtering egg image data from background image data.

15. The method as claimed in claim 11, wherein said combining the set of images into the first fused image comprises selecting a subset of the images to combine into the first fused image, wherein said selecting the subset of the images is based on at least one of:
a particular characteristic to be detected; or
eggshell color and avian information.

16. The method as claimed in claim 11, comprising:
providing, by the at least one processor, an indicator of the at least one characteristic, as classified.

17. The method as claimed in claim 11, wherein:
at least one of:
the image features include image texture features as a set of quantitative measures calculated in image processing to describe the spatial and spectral information of the first fused image or a region of the first fused image;
the image features are selected from the group consisting of at least one first-order image feature and at least one second-order image feature;
the image texture features comprise a second-order measure that reflects a relationship between neighbouring pixels in the fused image or the region of the fused image;
the image texture features comprise a set of quantitative measures calculated in image processing designed to describe spatial and spectral information of the fused image or a region of the fused image; or
the image features are learned by an artificial intelligence system to describe spatial and spectral information of the fused image or a region of the first fused image.

18. The method as claimed in claim 11, comprising:
at least one of:
determining, by the at least one processor, that the unhatched egg is a white egg or a brown egg for calibration of an imaging system for generating the set of images; or
accepting, by the at least one processor, laying avian information and eggshell color for calibration of an imaging system for generating the set of images.

19. The method as claimed in claim 11, comprising:
receiving, at an apparatus, the data signals of the results transmitted by the transceiver; and
using, by the apparatus, the data signals to actuate the apparatus according to at least one characteristic to make physical contact with the unhatched egg to move or separate the classified unhatched egg based on the at least one characteristic.

20. The method as claimed in claim 11, comprising:
generating the set of spectral images of the unhatched egg from an imaging interface for one of:
a spectrograph and a camera; or
a hyperspectral imaging device.

* * * * *